United States Patent
Biemueller et al.

(10) Patent No.: US 10,404,579 B1
(45) Date of Patent: Sep. 3, 2019

(54) VIRTUAL MACHINE INSTANCE MIGRATION USING A HYPERVISOR

(71) Applicant: Amazon Technologies, Inc., Seattle, WA (US)

(72) Inventors: Sebastian Martin Biemueller, Dresden (DE); Georgios Elissaios, Seattle, WA (US); Diwakar Gupta, Seattle, WA (US); Hui Ma, Bellevue, WA (US); Pieter Kristian Brouwer, Issaquah, WA (US); Mohammad Farhan Husain, Redmond, WA (US); Thomas Friebel, Dresden (DE)

(73) Assignee: Amazon Technologies, Inc., Seattle, WA (US)

( * ) Notice: Subject to any disclaimer, the term of this patent is extended or adjusted under 35 U.S.C. 154(b) by 186 days.

(21) Appl. No.: 14/961,765

(22) Filed: Dec. 7, 2015

(51) Int. Cl.
*H04L 12/761* (2013.01)
*H04L 12/863* (2013.01)
*H04L 29/12* (2006.01)
*H04L 12/741* (2013.01)
*H04L 12/24* (2006.01)

(52) U.S. Cl.
CPC .......... *H04L 45/16* (2013.01); *H04L 41/0803* (2013.01); *H04L 45/74* (2013.01); *H04L 47/50* (2013.01); *H04L 61/25* (2013.01)

(58) Field of Classification Search
CPC ..... H04L 45/16; H04L 45/74; H04L 41/0803; H04L 47/50; H04L 61/25
See application file for complete search history.

(56) References Cited

U.S. PATENT DOCUMENTS

| | | | | |
|---|---|---|---|---|
| 2010/0153514 | A1* | 6/2010 | Dabagh | G06F 13/4022 709/213 |
| 2012/0096459 | A1* | 4/2012 | Miyazaki | G06F 9/45558 718/1 |
| 2013/0254404 | A1* | 9/2013 | Johnsen | G06F 9/45533 709/226 |
| 2013/0290661 | A1* | 10/2013 | Reuther | G06F 3/0647 711/162 |
| 2015/0309828 | A1* | 10/2015 | Shaik | G06F 9/5027 718/1 |
| 2015/0331715 | A1* | 11/2015 | Sathyanarayana | H04L 67/10 709/226 |
| 2015/0363238 | A1* | 12/2015 | Bai | G06F 9/5022 718/1 |
| 2015/0370596 | A1* | 12/2015 | Fahs | G06F 9/46 718/1 |

* cited by examiner

*Primary Examiner* — Rina C Pancholi
(74) *Attorney, Agent, or Firm* — Davis Wright Tremaine LLP

(57) ABSTRACT

Techniques for managing a critical phase of a virtual machine migration are described herein. During the critical phase, which must be kept as short as possible, a virtual machine instance is paused, network packets are rerouted to a temporary packet queue, and messages associated with managing synchronization of block storage devices are dispatched to an entity configured to manage those connections. After the block storage devices are synchronized, the network packets are released from the temporary packet queue to the new location of the virtual machine instance.

20 Claims, 16 Drawing Sheets

VIRTUAL MACHINE INSTANCE MIGRATION USING A HYPERVISOR

BACKGROUND

Modern computer systems are frequently implemented as virtual computer systems operating collectively on one or more host computer systems. The virtual computer systems may utilize resources of the host computer systems such as processors, memory, network interfaces, and storage services. When the resources of a particular host computer system become scarce due to, for example, overutilization by client virtual computer systems, it may become necessary to move a virtual computer system to a different host computer system to avoid reduced system performance, increased system outages or failures, and a degraded user experience.

One approach to the problem of moving or migrating a virtual computer system to a different host computer system is to halt the virtual computer system, copy the memory and/or the system state of the virtual computer system to the different host computer system, and then restart the virtual computer system. However, in the case of a large or complicated virtual computer system, this migration process can take a significant amount of time, and the ability of a user to interact with the virtual computer system during that time period may be eliminated or at least severely restricted. Additionally, some system resources, such as attached storage and network connections may be volatile, introducing the possibility that the migrated virtual computer system may differ significantly from the original virtual computer system, further introducing operational issues.

BRIEF DESCRIPTION OF THE DRAWINGS

Various techniques will be described with reference to the drawings, in which.

DETAILED DESCRIPTION

Figure 1:
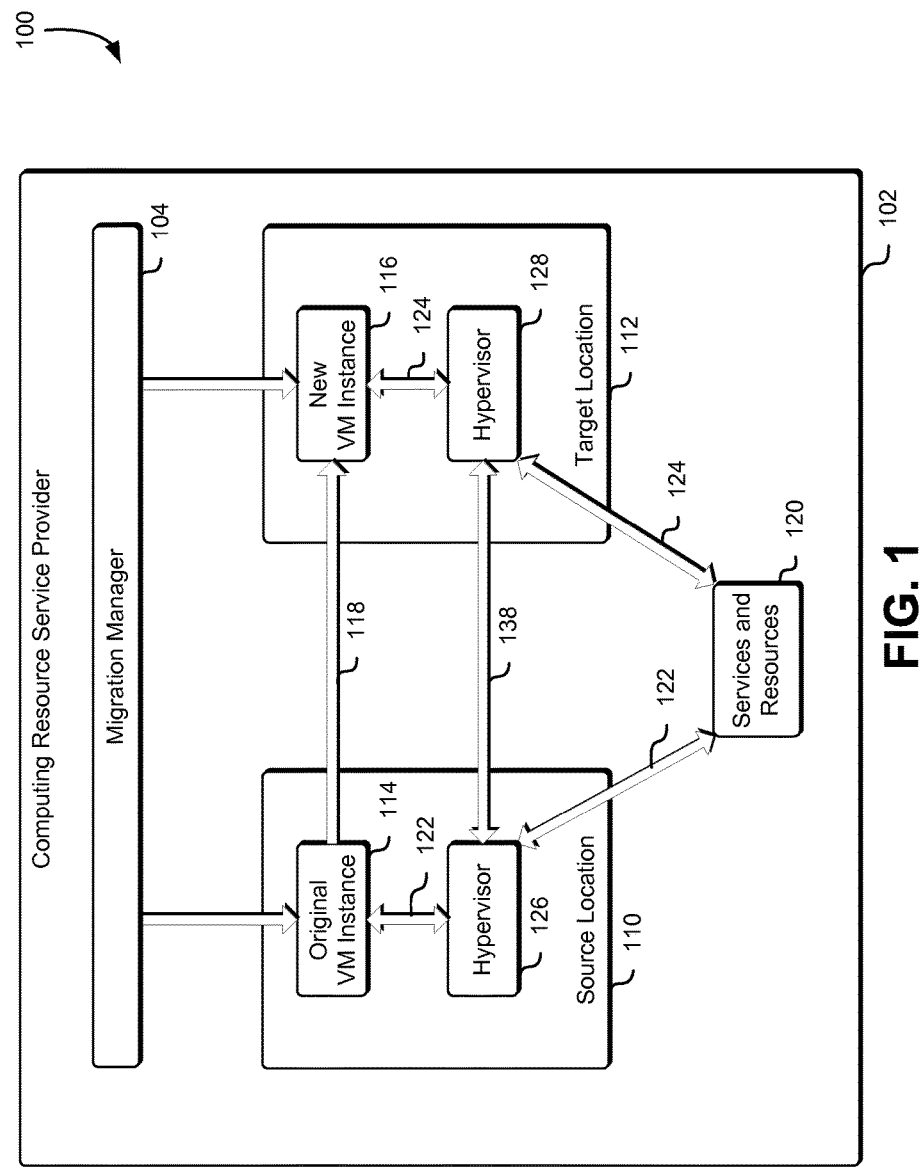
FIG. 1 illustrates an example environment where a virtual machine instance is migrated to a new location using a hypervisor.

This disclosure relates to managing the critical migration phases during the migration of virtual machine instances from a first source location to a second target location. A computing resource service provider may manage resources associated with a virtual machine instance so that resource states are maintained during the migration and the impact of the migration is minimized. Examples of resources associated with a virtual machine instance are network connections, storage devices, processors, memory, access to services provided by the computing resource service provider, and access to specialized hardware. Typically, the processes, memory, and specialized hardware are replaced in the migration, but the internal system state of, for example, the network connection and the storage devices must be maintained during the migration.

In one example how a migration may be managed, a service operating within a computing resource service provider environment may determine that a virtual machine ("VM") instance may be migrated from a first host computer system to a second host computer system. The migration may be a live migration where the execution of a virtual machine is paused on a first location and resumed in another. In a live migration, the original VM instance must remain available for as long as possible so as not to disrupt a user's interaction with the VM instance. During a live migration, a new VM instance is instantiated in a new location and, after the new VM instance is prepared, a critical phase of the migration starts where the original VM instance is paused, any remaining differences between the original VM instance and the new VM instance are resolved, resource states are migrated, and the new VM instance is started. The length and impact of the critical migration phase, when the virtual machine instance may be unavailable to a user, can be minimized by performing a majority of the migration before locking the VM and thus minimizing the amount of time that the VM is unavailable.

In some examples, a live migration proceeds in phases so that, if any one phase does not complete successfully, the migration may be cancelled and any changes may be rolled back. In the first migration phase, after it has been determined that a running virtual machine instance is a candidate for migration from a first host computer system (also referred to as the "source" or the "source location") to a suitable second host computer system (also referred to as the "target" or the "target location"), the second host computer system may be prepared for the migration. This preparation may include ensuring that the right operating system and/or applications are running on the target location and that the target location has sufficient resources available to host the virtual machine instance. In the second migration phase, a new instance of the virtual machine may then be created on the target with the same configuration as the running virtual machine instance (also referred to as the "original virtual machine instance") by the migration manager and memory and state information from the original virtual machine instance may copied to the new virtual machine instance while the original virtual machine instance continues to run.

During the first and second migration phases, the virtual machine instance remains available to the user. After the target is created, a majority of the memory and/or state of the running virtual machine instance may be copied to the new virtual machine instance so that the difference between the two virtual machines is minimized. This copying may keep the differences between the two virtual machines to a minimum by forwarding any changes to the memory or state of the original virtual machine instance to the new virtual machine instance. This memory and state copy is typically iterative in that the memory and/or state of the running virtual machine instance may be copied over from start to finish in a first iteration, and then any memory and/or state that changed during the copy may be copied over in a second iteration. In subsequent additional iterations, the memory and state will continue being copied while the original VM instance is running, until it is either determined that the next copy will be small enough to perform the live migration based on, for example, a number of changes from previous iterations, or if it is determined that the memory is too large or volatile for a live migration.

In the third migration phase, the original virtual machine instance may then be locked by the migration manager, so that the final changes to the memory and/or state of the original virtual machine instance may be propagated to the new virtual machine instance. In an embodiment, the final changes to the memory and/or state of the original virtual machine instance can be propagated to the new virtual machine instance so that the two virtual machine instances are identical. This phase, the flip phase, must be kept as short as possible so that the user experience is not degraded due to a perception that the original virtual machine is locked or paused.

The length and impact of the critical migration phase can also be minimized by dividing the critical migration phase or "flip" into stages that, in the examples described herein, may be managed by a hypervisor. In the first flip stage (referred to herein as the "pause stage" of a migration), a pause command is sent to the original virtual machine instance. Because the pause may take some time (i.e., because it is not an atomic operation), the migration manager waits for the pause to complete before beginning a second flip stage (referred to herein as the "route stage" of the migration). In an embodiment, the final copy of memory and/or state of the original virtual machine instance can begin in parallel with the pause stage of the migration using, for example, a separate thread. In another embodiment, the final copy of memory and/or state of the original virtual machine instance will not begin until after the virtual machine instance is paused (e.g., until after the end of the pause stage of the migration).

In the route stage of the migration, the network connection is managed at the source location. In the route stage of the migration, packet processing by the original virtual machine instance is stopped (because the original virtual machine instance is paused), and the incoming packets are redirected to a privileged domain on the host computer system as described below. In addition to redirecting the incoming packets, the state of the networking system (e.g., the state of the network stack) is also copied from the source location to the target location. In an embodiment, copying the state of the networking system can be performed in parallel with the final copy of memory and/or state described above.

At the end of the route stage of the migration, the hypervisor of the source location sends a message to the hypervisor of the target location indicating that the route stage of the migration is done. This alerts the hypervisor at the target location to begin a third flip stage (referred to herein as a "standby lease stage" of the migration). The standby lease stage of the migration begins by validating a standby lease for any block storage devices so that the state of the block storage devices can be maintained during the migration. The standby lease or leases may be generated and/or acquired prior to beginning the critical phase of the migration as generating a standby lease may be a time-consuming operation. The standby lease (described below) provides access to, but no permissions to read to or write from the block storage device. In the standby lease stage of the migration, the original VM instance still has an active lease for the block storage device, but as the original VM instance is paused, it also does not read to or write from the block storage device. During the standby lease stage of the migration, any incoming packets are received by the privileged instance at the source location.

After the standby lease stage of the migration completes, the network connection to the new VM instance is activated and the privileged instance at the source location begins sending the queued packets to the new VM instance at the target location using the network connection in a fourth flip stage (referred to herein as a "packet forward stage" of the migration). At this stage, there may be a "handshake" between the hypervisor at the source location and the hypervisor at the target location to ensure that the flip stages of the migration should continue, as described below. Because the new VM instance still may not be fully active, the queued packets may be queued in the new VM instance. Finally, in a fifth flip stage (referred to herein as an "active lease stage" of the migration), the standby lease of the new VM instance is made an active lease and the active lease of the original VM instance is made an inactive lease. Assuming all flip stages have completed successfully, the migration is complete and the fourth migration phase can begin. It should be noted that the migration can be cancelled at any stage of the five flip stages and, in that event, each flip stage may also have a corresponding "unflip" stage, where the operations for the flip are reversed and the original VM instance is restored. As an example, an unflip stage of the route stage of the migration may involve unpausing the original VM instance and sending the packets in the incoming packet queue from the privileged domain to the original VM instance. In an embodiment, each set of flip stages has a corresponding set of unflip stages and each flip stage in the set of flip stages has a corresponding unflip stage in the set of unflip stages. In another embodiment, each flip stage corresponds to one or more unflip stages (i.e., one or more unflip stages reverse each flip stage). In another embodiment, each unflip stage corresponds to one or more flip stages (i.e., each unflip stage reverses one or more flip stages).

In the fourth migration phase, if the five flip stages complete successfully, access to the new virtual machine instance may be provided to the user, connections to resources associated with the original virtual machine instance may be terminated, and after the original virtual machine instance and the new virtual machine instance have converged (i.e., after all pending calls have been received and correctly propagated), the original virtual machine instance may be terminated and resources associated with the original virtual machine instance may be reclaimed (this process is also referred to as "tearing down," being "torn down," or as a "tear down"). Conversely, if in the fourth phase the flip does not complete successfully due to an error, a cancellation of the migration, or some other such event, access to the original virtual machine instance may be returned to the user (i.e., it may be unlocked) and the new virtual machine instance may be torn down.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment 100 where a virtual machine instance is migrated to a new location using a hypervisor in accordance with an embodiment. One or more virtual machine instances may be operating on host computer systems provided by a computing resource service provider 102 as described herein. In the example illustrated in FIG. 1, a first virtual machine instance (the original VM instance 114) is running in a first location (the source location 110). The first location may be one or more host computer systems configured to provide shared hardware to a virtual computer system service for the instantiation of one or more virtual machine instances. The original VM instance 114 may be one of several virtual machine instances associated with the source location 110. Each of the virtual machine instances associated with the source location 110 may be running, may be paused, may be suspended (e.g., paused and stored to secondary storage), or may be in some other state. In the example illustrated in FIG. 1, the original VM instance 114 is running (e.g., is performing one or more operations as a result of executing executable code).

In the course of the operation of the original VM instance 114, a migration service may determine that the original VM instance 114 can be migrated from the source location 110 to a target location 112. The determination that the original VM instance 114 can be migrated from the source location 110 to a target location 112 may be made as a result of changes in the availability of resources at the source location 110 (e.g., a shortage of computing power, a shortage of memory, or a lack of network bandwidth). The determination that the original VM instance 114 can be migrated from the source location 110 to a target location 112 may also be made to move the original VM instance 114 logically closer to one or more resources of the computing resource service provider. The determination that the original VM instance 114 can be migrated from the source location 110 to a target location 112 may include a determination of one or more candidate locations from a set of available candidate locations based on resource availability, location, cost, or other selection criteria.

The determination that the original VM instance 114 can be migrated from the source location 110 to a target location 112 may also be made by a customer request to, for example, reduce one or more costs associated with operating the original VM instance 114 at the source location 110. For example, the host machines at the target location may have a lower per-second cost to operate because they have less memory or a more efficient or newer CPU. The determination that the original VM instance 114 can be migrated from the source location 110 to a target location 112 may also be made by a service, process, or module operating in association with the computing resource service provider that may be configured to determine more optimal locations form virtual machine instances. In the example illustrated in FIG. 1, the target location 112 is shown within the computing resource service provider 102 because, for instance, the target location is a computer system hosted by or otherwise under the control of the computing resource service provider. In an embodiment, either the source location 110, the target location 112, or both can be outside of the computing resource service provider 102 (e.g., they may be provided by customer and/or other third party environments).

The request to migrate the original VM instance 114 from the source location 110 to the target location 112 may be received by a migration manager 104 operating with the computing resource service provider 102. In an embodiment, the migration manager 104 is implemented as a service that may be one of several services provided by the computing resource service provider 102. The migration manager 104 may also be referred to herein as a migration manager computer system and, in some embodiments, can be implemented as a distributed computer system as described herein.

When migrating the original VM instance 114 from the source location 110 to the target location, a number of systems, services, processes, and resources may be communicating with the original VM instance 114. These systems, services, processes, and resources cannot generally be guaranteed to change their behavior simultaneously so that their communications switch from the original VM instance 114 at the source location 110 to a new VM instance 116 at the target location 112. The migration manager 104 may be configured to communicate with each of the systems, services, processes, and resources to manage the migration.

The migration manager 104 may manage (or orchestrate) the migration by selecting one or more operations to perform based at least in part on the state of the migration and/or the classification of one or more requests (e.g., application programming interface requests) and then by performing those selected operations. For example, the migration manager may select and perform one or more operations to determine the proper order for migration, manage a workflow for migration, issue commands to the systems, services, processes, and resources associated with the migration, determine whether the migration is successful, start and stop virtual machine instances, determine whether the migration has failed, determine whether the migration should be cancelled, and manage a migration rollback if errors occur.

During a migration, each of the applicable systems, services, processes, and resources associated with the migration may only be notified of their portion of the migration. The migration manager 104 may manage the migration in phases as described herein and may manage the migration of each of the systems, services, processes, and resources associated with the migration by issuing API requests, making library calls, using interfaces (e.g., a web interface), or by some other means. The phase of a migration (also referred to herein as the "current state of the migration") may determine whether requests such as application programming interface requests may be allowed or blocked, and may also be used to determine whether a migration should be cancelled. The migration manager 104 may also manage timeouts for each of the phases and/or for each migration action associated with each of the systems, services, processes, and resources associated with the migration which may also be used to determine whether a migration should be cancelled. For example, a block storage service may, during a migration, receive an API request from the migration manager 104 to provide access to a block storage device to the new VM instance 116. As part of this access, the block storage service may need to synchronize input-output ("I/O") requests between the original VM instance 114 and the new VM instance 116. The migration manager 104 may establish a timeout value for this synchronization so that, for example, if the block storage service does not respond to the API request in a reasonable amount of time, the migration may be cancelled.

When the request to migrate the original VM instance 114 from the source location 110 to the target location 112 is received by a migration manager 104 operating with the computing resource service provider 102, one or more commands may be generated by the migration manager 104 in response to that request. The one or more commands may include commands to configure the target location to instantiate a new virtual machine instance, commands to instantiate a new virtual machine instance at the target location 112, commands to copy the memory and/or state from the original VM instance 114 to a new VM instance 116, commands to deactivate the original VM instance 114, commands to activate the new VM instance 116, commands to lock either the original VM instance 114 or the new VM instance 116, commands to pause either the original VM instance 114 or the new VM instance 116, commands to unpause either the original VM instance 114 or the new VM instance 116, commands to forward memory and/or state information from the original VM instance 114 to the new VM instance 116, commands to tear down the original VM instance 114, commands to terminate a migration between the source location 110 and the target location 112, and other such commands associated with the migration 118 of the original VM instance 114 from the source location 110 to the target location 112.

The original VM instance 114 may have access 122 to one or more services and resources 120 provided by the computing resource service provider 102. For example, the computing resource service provider may provide access 122 to services and resources 120 such as network interfaces, storage services, authentication services, authorization services, and/or other resources and services. As part of the migration 118 of original VM instance 114 from the source location 110 to a target location 112, the migration manager 104 may instantiate a new VM instance 116 at the target location 112 and may provide access 124 to the same services and resources 120 as may be provided to the original VM instance 114. In the example illustrated in FIG. 1, access to the services and resources 120 is provided by a hypervisor running in each of the source location and target location. For example, access 122 by the original VM instance 114 to the services and resources 120 is provided by the hypervisor 126 running in the source location 110 and access 124 by the new VM instance 116 to the services and resources 120 is provided by the hypervisor 128 running in the target location 112. In an embodiment, a hypervisor such as the hypervisor 126 manages and controls all access to the services and resources 120. In another embodiment, a hypervisor such as the hypervisor 126 manages and controls access to the services and resources 120, but also allows the VM instance to access the services and resources 120 independently of the hypervisor.

Figure 2:
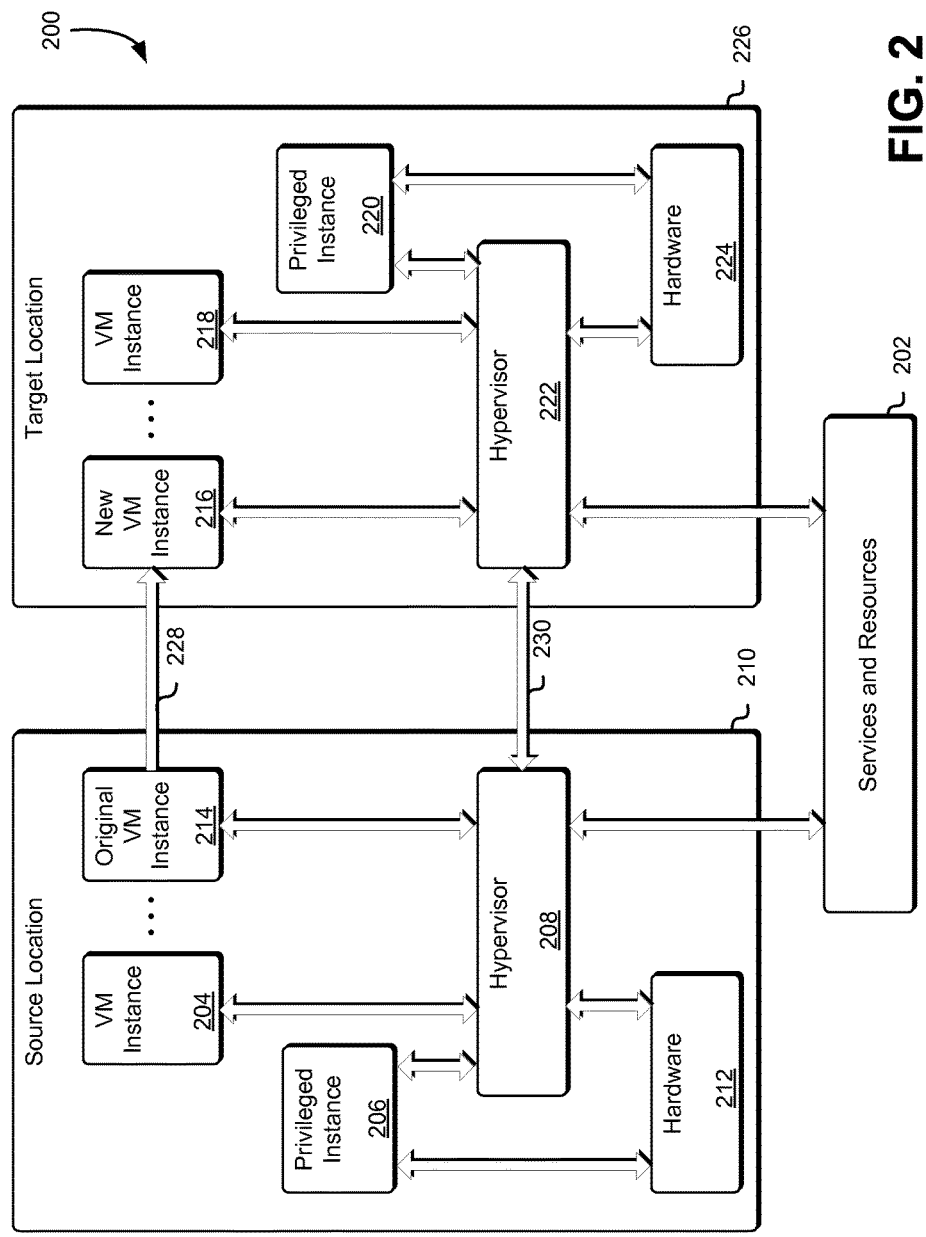
FIG. 2 illustrates an example environment where a hypervisor coordinates a virtual machine instance migration.

FIG. 2 illustrates an example environment 200 where a hypervisor manages a virtual machine instance migration as described in connection with FIG. 1 and in accordance with an embodiment. The original VM instance 214 at the source location 210 may be a candidate for migration to a target location 226 as described above. A host computer system of the source location 210 may host one or more additional VM instances 204. The VM instances, including the original VM instance 214 may be managed by a hypervisor 208 that is configured to manage VM instances on behalf of the host computer system of the source location. The hypervisor 208 may also provide access to the hardware 212 of the host computer system of the source location (e.g., the central processing unit ("CPU") of the host computer system, the memory of the host computer system, specialized hardware of the host computer system, and other such hardware). The hypervisor 208 may also provide access to services and resources 202 provided by the computing resource service provider such as those described above.

The hypervisor 208 (and the hypervisor 222, described below), operates on a host computer system (e.g., as software, hardware, or firmware) to manage and monitor virtual machine instances on the host computer system. A hypervisor virtualizes hardware 212 of the host computer system and provides access to that hardware to the guest virtual machine instance according to a resource schedule. In an example, a host computer system may have four CPUs and sixteen gigabytes ("GB") of available memory. If the host computer system is hosting a single virtual machine instance which requires two CPUs at 50% capacity and four GB of memory, the hypervisor can provide the virtual machine instance with the two CPUs and the four GB without any resource scheduling. By contrast, if the host computer system is hosting eight such virtual machine instances (requiring sixteen CPUs at 50% capacity and 32 GB of memory), the hypervisor must schedule access by each of the eight virtual machine instances to the CPUs and the memory. In this example, the hypervisor may simply schedule each VM instance to run approximately half the time and to be paused approximately half the time. However, it is typical for a hypervisor to do resource scheduling in a more advanced manner, reclaiming memory from running instances when their needs are low, providing memory when needs are high, and/or allocating CPU time accordingly.

In the example illustrated in FIG. 2, the hypervisor provides access to the hardware 212 and also provides access to and management of the services and resources 202. However, the VM instances may also have direct access to the services and resources 202 and/or may have share management of the services and resources 202 with the hypervisor 208. A VM instance typically does not have direct access to the hardware 212 except where that direct access is provided by the hypervisor. The host computer system at the source location 210 may also include a privileged instance 206 (e.g., a "domain 0") that does have direct access to the hardware 212. The privileged instance 206 is a virtual machine instance that is configured to perform privileged functions associated with the host computer system and/or the VM instances.

For example, a privileged instance may run services that are needed by the virtual machine instances. One example of such a service is a network translation service that translates incoming and outgoing network packets from the physical address of the host computer system to the logical addresses of the virtual machine instance. Such a network translation service (not shown in FIG. 2), which may run within the privileged instance 206 under the control of the hypervisor 208, may receive network packets from the network adaptor hardware and, using a table of entries for the network addresses of the VM instances, may determine if each packet should be routed to one or more of the VM instance locations. The network translation service may then alter the packet header to route network packets to the correct VM instance location or locations. For example, the network translation service may alter the packet header to route the network packets to the target location and may also duplicate the packet and alter the packet header of the duplicated packet to route the network packets to the source location. The network translation service may similarly receive packets from the VM instances and alter the packet header so that the packet appears to be sent from the host computer system. This process of routing packets to and from the correct VM instances allows the VM instances to share the network interface of the host computer system.

In the example illustrated in FIG. 2, the original VM instance 214 is being migrated 228 to a new VM instance 216 at a target location 226. Just as with the source location, a host computer system at the target location 226 has a hypervisor 222 that manages and/or controls access to hardware 224 of the host computer system by the VM instances 218 and that also manages and/or controls access by the VM instances 218 to the services and resources 202 of the computing resource service provider. As with the source location, the host computer system at the target location 226 may also include a privileged instance 220 with direct access to the hardware 224 and, like the privileged instance 206, is a virtual machine instance that is configured to perform privileged functions associated with the host computer system and/or the VM instances.

Coordination of the migration 228 of original VM instance 214 from the source location 210 to the new VM instance 216 at the target location may be managed by a connection 230 between the hypervisor 208 at the source location 210 and the hypervisor 222 at the target location 226. The connection 230 between the hypervisor 208 and the hypervisor 222 may typically be via a Transmission Control Protocol/Internet Protocol ("TCP/IP") or User Datagram Protocol ("UDP") connection that uses the network adaptor of the host computer system.

Figure 3:
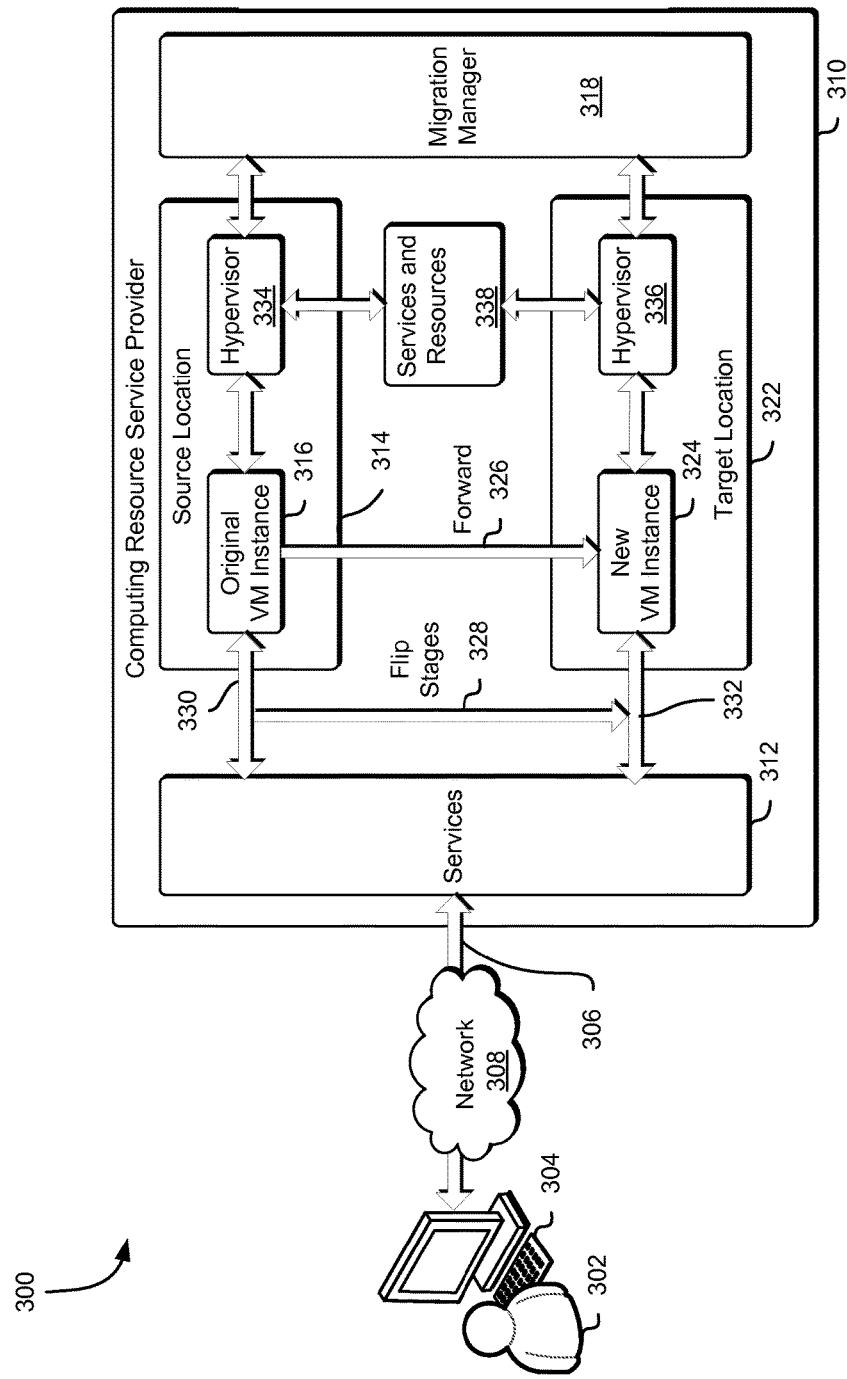
FIG. 3 illustrates an example environment where the migration of a virtual machine instance is managed.

FIG. 3 illustrates an example environment 300 where the migration of a virtual machine instance is managed by a hypervisor as described in FIG. 1 and in accordance with at least one embodiment. A user 302 may connect 306 to one or more services 312 through a computer system client device 304. The services 312 may be provided by a computing resource service provider 310. In some embodiments, the computing resource service provider 310 may provide a distributed, virtualized, and/or datacenter environment within which one or more applications, processes, services, virtual machines, and/or other such computer system entities may be executed. In some embodiments, the user 302 may be a person, or may be a process running on one or more remote computer systems, or may be some other computer system entity, user, or process.

The command or commands to the services and resources may originate from an outside computer system or from within the computing resource service provider. In some embodiments, the command or commands to initiate the connection 306 to the computing resource service provider 310 may be sent to the services 312, without the intervention of the user 302.

The computing resource service provider 310 may provide access to one or more host machines, as well as provide access one or more virtual machine (VM) instances as may be operating thereon. The services 312 provided by the computing resource service provider 310 may also be implemented as and/or may utilize one or more VM instances as may be operating on the host machines. For example, the computing resource service provider 310 may provide a variety of services to the user 302 and the user 302 may communicate with the computing resource service provider 310 via an interface such as a web services interface or any other type of interface. While the example environment illustrated in FIG. 3 shows a single connection or interface for the services 312 of the computing resource service provider 310, each of the services may have its own interface and, generally, subsets of the services may have corresponding interfaces in addition to or as an alternative to the single interface.

The computing resource service provider 310 may provide various services such as the services 312 to its users or customers. The services provided by the computing resource service provider 310 may include, but may not be limited to, virtual computer system services, block-level data storage services, cryptography services, on-demand data storage services, notification services, authentication services, policy management services, or other services. Not all embodiments described may include all of these services, and additional services may be provided in addition to or as an alternative to the services explicitly described. As described above, each of the services 312 may include one or more web service interfaces that enable the user 302 to submit appropriately configured API requests to the various services through web service requests. In addition, each of the services 312 may include one or more service interfaces that enable the services to access each other (e.g., to enable a virtual machine instance provided by the virtual computer system service to store data in or retrieve data from an on-demand data storage service and/or to access one or more block-level data storage devices provided by a block-level data storage service).

In an example, a virtual computer system service may be a collection of computing resources configured to instantiate virtual machine instances on behalf of a customer such as the user 302. The customer may interact with the virtual computer system service (via appropriately configured and authenticated API requests) to provision and operate virtual machine instances that are instantiated on physical computing devices hosted and operated by the computing resource service provider 310. The virtual computer system service may also be configured to initiate the migration of virtual machine instances as described herein. The virtual machine instances may be used for various purposes, such as to operate as servers supporting a website, to operate business applications or, generally, to serve as computing power for the customer. Other applications for the virtual machine instances may be to support database applications, electronic commerce applications, business applications, and/or other applications.

In another example, a block-level data storage service may comprise one or more computing resources that collectively operate to store data for a customer using block-level storage devices (and/or virtualizations thereof). The block-level storage devices of the block-level data storage service may, for example, be operationally attached to virtual machine instances provided by the virtual computer system service described herein to serve as logical units (e.g., virtual drives) for the computer systems. A block-level storage device may enable the persistent storage of data used/generated by a corresponding virtual machine instance where the virtual computer system service may only provide ephemeral data storage for the virtual machine instance.

In the example illustrated in FIG. 3, the one or more services 312 may be implemented as, or may be supported by one or more virtual machine instances as described above. For example, the one or more services 312 may include an original VM instance 316 visible to the user 302 (i.e., configured such that the user 302 may use and/or otherwise interact with the original VM instance 316). The original VM instance 316 may be running at first, or source location 314, as described above. Upon receiving a command to migrate the original VM instance 316 from the source location 314 to a target location 322, a migration manager 318 may begin the migration from the source location 314 to the target location 322 as described above using the hypervisor 334 in the source location 314 and the hypervisor 336 in the target location 322. In the example illustrated in FIG. 3, the hypervisor 334 and the hypervisor 336 may provide control and access to the services and resources 338. The services and resources 338 may include one or more of the services 312 and access by the virtual machine instances to the services 312 may be controlled and/or managed by the hypervisors.

The migration may be accomplished by instantiating a new VM instance 324 at the target location 322 and copying memory and/or state from the original VM instance 316 to the new VM instance 324. The migration may also be accomplished by forwarding 326 memory and/or state changes from the original VM instance 316 to the new VM instance 324. For example, if during the migration, the user 302 alters a memory location on the original VM instance 316 (e.g., as a result of executing an application) after that memory has copied from the original VM instance 316 to the new VM instance 324, the new memory value may be forwarded to the new VM instance 324. This forwarding 326 of memory and/or state changes may serve to keep the new VM instance 324 synchronized with the original VM instance 316 during migration.

As described herein, the last phase of the migration prior to cleanup is the flip stages 328. During the flip stages 328 (described below), the original VM instance 316 may have one or more of the changes locked out so that the user 302 and/or other processes associated with the original VM instance 316 may not alter or mutate the original VM instance 316. During the flip stages 328, any remaining differences between the original VM instance 316 and the new VM instance 324 may then be copied from the original VM instance 316 to the new VM instance 324. If the flip stages 328 are successful, the connection 330 from the services 312 to the original VM instance 316 may be replaced by a connection 332 from the services 312 to the new VM instance 324 so that, from the user's perspective, the backing VM instance appears to be the same as before the migration (because, for example, the new VM instance 324 may be substantially the same as the original VM instance 316). If the flip is not successful, the connection 330 from the services 312 to the original VM instance 316 may be retained so that, from the user's perspective, the backing VM instance is appears to be the same as before the attempted migration (because it has not changed). Thus, regardless of whether the migration is successful or not (e.g., because of failure or cancellation), the user may still perceive the same system state and may consider the original VM instance 316 and the new VM instance 324 as the same.

In an embodiment, the management and/or coordination of the flip stages are controlled by the hypervisors such as hypervisor 334 and hypervisor 336 using remote procedure calls. A remote procedure call is a call from one computer system entity (e.g., a hypervisor) to a second computer system entity (e.g., a service or resource) that causes the second system entity to perform one or more operations associated with the remote procedure call. The one or more operations are performed by the second computer system entity, using resources associated with that entity. In an example, described in more detail below, a standby lease stage of the migration that is coordinated by a hypervisor requires a connection to a block-storage service to validate a previously generated standby lease to a block storage device. In the embodiment where management and/or coordination of the flip stages are controlled using remote procedure calls, the hypervisor may make a remote procedure call to the block-level storage service instructing the block-level storage service to validate the standby lease. In an embodiment where a network device or a virtual network device is associated with the block storage devices, the hypervisor may make a remote procedure call to the network device or virtual network device to validate the standby lease. As used herein, a "network device" is a hardware device associated with a host computer system (e.g., the source location and/or the target location) that is configured to perform one or more flip stages of the critical migration phase and a "virtual network device" is a virtualization of that network device that is provided to VM instances by, for example, the hypervisor.

In another embodiment, the management and/or coordination of the flip stages are controlled by the hypervisors such as hypervisor 334 and hypervisor 336 using more general remote procedure calls. In this embodiment, the hypervisor does not need to make a specific remote procedure call (e.g., the remote procedure call to the block-level storage service instructing the block-level storage service to provide the standby lease) but instead may make a remote procedure call to perform the standby lease stage of the migration. In such an embodiment, the hypervisor would not need to have prior knowledge about what the block-level storage service does in the standby lease stage of the migration, nor would the hypervisor need to be updated if, for example, the application programming interface of the block-level storage service changed. In such an embodiment, the configuration for what is done in, for example, the operations associated with the standby lease stage of the migration may be stored in a common location such as a file location and accessed by the hypervisor.

In this embodiment, new services may join in the flip stages without altering the hypervisor. For example, a network translation service (as described below) may be activated for the route stage of the migration by configuring the network translation service to respond to the remote procedure call for that flip stage. The services may be configured to receive remote procedure calls from the hypervisors and the hypervisors may be configured to send remote procedure calls directly to the services. The services may also be configured to perform null operations (i.e., to do nothing) for certain flip stages. In another embodiment, the services can subscribe to the remote procedure calls so that, for example, the hypervisor may merely broadcast the start and/or end of the flip stages. In such an embodiment, the services may subscribe only to the flip stages that are relevant to those services.

In another embodiment, the hypervisors may also be configured to receive remote procedure calls from other hypervisors and/or services. For example, the route stage of the migration (described below) starts after the first virtual machine instance is paused. Because a virtual machine service may be configured to detect when a virtual machine service is paused, the first hypervisor may simply make a remote procedure call to the virtual machine service to start the pause (i.e., start the pause stage of the migration) and then wait for a remote procedure call from the virtual machine service indicating that the pause is complete, thereby allowing the first hypervisor to start the route stage of the migration. Similarly, the two hypervisors (e.g., hypervisor 334 and hypervisor 336) coordinate at several points during the flip stages. For example, the standby lease stage of the migration may start in the target location 322 after the route stage of the migration finishes in the source location 314.

As described above, the hypervisor of the source location may sent a message to the hypervisor of the target location indicating that the route stage of the migration is done and the standby lease stage of the migration may begin. In an embodiment, coordinating the flip stages can be performed by making remote procedure calls from one hypervisor to the other. For example, the hypervisor 334 in the source location 314 makes a remote procedure call to the hypervisor 336 in the target location 322 instructing the hypervisor 336 to begin the route stage of the migration. In another embodiment, the standby lease stage is not explicitly triggered by a message or a remote procedure call but is instead triggered by the receipt, at the target location, of a set of processor state information. In such an embodiment, the receipt, at the target location, of the set of processor state information provides an indication that the VM instance at the source location is paused and the route stage of the migration is complete. In such an embodiment, further parallelization of the stages may be accomplished (e.g., executing both the standby lease stage and the packet forward stage at the same time) when, as described herein, the stages are associated with different resources.

In an embodiment, after the flip stages 328, if the flip is successful, the original VM instance 316 is no longer accessible to the user 302 and/or to the services 312. After the flip stages 328, if the flip is not successful, the new VM instance 324 is not accessible to the user 302 and/or to the services 312. This is to ensure that, after the flip, only one of the two virtual machine instances is available to the user 302 and/or to the services 312. As part of the flip, the migration manager 318 and/or one or more agents or services under the direction of the migration manager 318 will enable at most one of the virtual machine instances by, for example, unpausing at most one paused virtual machine instance, unlocking at most one locked virtual machine instance, enabling at most one disabled virtual machine instance, or a combination of these or other operations to cause at most virtual machine instance to running after the flip.

In an embodiment, when errors occur during the flip stages 328, the migration manager 318 or some other computer system entity (e.g., a hypervisor or an agent running on the source location and/or on the target location) performs one or more operations in response to the error. Examples of errors that may occur include, but are not limited to, the failure to prepare the target location 322 to instantiate the new VM instance 324, the failure to attach one or more resources to the new VM instance 324, the failure to detach one or more resources from the original VM instance 316, or some other failure (e.g., a power outage during migration or a loss of network connectivity between locations). Such errors may be ignored if they are of a type classified as not being harmful to the migration or if ignoring the error allows the error to be processed by some other process, module, application, or service. For example, an error in migrating a device may be ignored if ignoring such an error results in the device being impaired after the migration and such impairment is detected by a process, module, application, or service associated with the device. Such errors may also cause the migration manager 318 and/or one or more other services to cancel the migration and attempt to undo the migration by undoing the operations that occurred prior to the attempted flip.

As an example of operations that could be performed to undo the migration, the migration manager 318 and/or one or more other services may invalidate, disable, and/or deactivate one or more credentials to access resources that may have been granted to the new VM instance 324 at the target location 322. The migration manager 318 and/or one or more other services may also re-validate, enable, and/or reactivate one or more credentials to access resources that may have been suspended for the original VM instance 316 at the source location 314 In an embodiment, the migration manager 318 and/or one or more other services restores the state of the system to the point before the migration by performing a new attachment to the resources, thus generating a new set of credentials to access the resources.

In another embodiment, the migration manager 318 provides a workflow to perform the flip, directing the original VM instance 316 and/or to the source location 314 to perform one or more operations to cause the flip to occur. In this embodiment, the migration manager 318 also provides a workflow to perform the flip stages 328, directing the original VM instance 316 and/or to the source location 314 to perform one or more operations to cause the flip to occur. In such an embodiment, the migration manager 318 also provides one or more workflow operations to the original VM instance or the new VM instance to undo the flip (i.e., "unflip") in the event of an error.

One or more actions may be performed in association with the workflow to handle errors and/or to undo the flip, depending on the cause and severity of the error. For example, the errors may be handled by resuming the original VM instance 316 at the source location 314 or by resuming the new VM instance 324 at the target location 322. In the examples described herein, the hypervisor in the source location and the hypervisor in the target location coordinate to perform the migration. If the hypervisors reach a state where they are not in agreement about the state of the migration, they may suspend the progress of the migration and wait for the migration manager 318 to resolve the discrepancy. The migration manager 318 may monitor communications and/or commands from the computing resource service provider to the hypervisors and may use such communications and/or commands to determine the state of the migration. As a result of determining such state, the migration manager 318 may then direct the hypervisors how to proceed with the migration (e.g., by determining whether to continue with the migration to the target location or to cancel the migration and resume execution at the source location).

In the event that the migration manager 318 cannot easily determine which VM instance to resume (e.g., in the event of a loss of a connection between the VM instances where the migration manager 318 cannot determine the state of the VM instances), the migration manager 318 may send commands to both of the VM instances, putting them both in a waiting state before determining which VM instance to resume and which to terminate. In the event of a catastrophic failure such as, for example, a power outage during the migration, the migration manager 318 may also have to wait until after power restoration to determine the state of the VM instances and/or to determine which may be resumed or restarted. As described above, the migration manager 318 performs operations that cause at most one VM instance to running at the end of the flip. In the event of a catastrophic failure, the migration manager may not be able to determine which VM instance to resume and may instead issue an alarm or an alert to inform an entity associated with the computing resource service provider of the indeterminable state.

In an embodiment, the migration manager 318 can determine whether the flip is successful by comparing a state of the original VM instance 316 to a state of the new VM instance 324. The state of the original VM instance 316 can be determined after the original VM instance 316 is locked and can be updated due to changes that may occur as the original VM instance 316 converges. The state of the new VM instance 324 can be determined after the flip has completed and after all changes have been forwarded from the original VM instance 316 to the new VM instance 324 (e.g., also after the original VM instance 316 converges). If a difference between the state of the original VM instance 316 and the state of the new VM instance 324 is below a minimum success threshold (i.e., the differences are minor, insignificant, or immaterial), then the flip is successful. Conversely if the difference between the state of the original VM instance 316 and the state of the new VM instance 324 is above the minimum success threshold (i.e., the differences are major, significant, or material), then the flip is a failure. Note that when the migration is cancelled or when requests are blocked, the differences may be above the minimum success threshold and the flip may be a failure.

Figure 4:
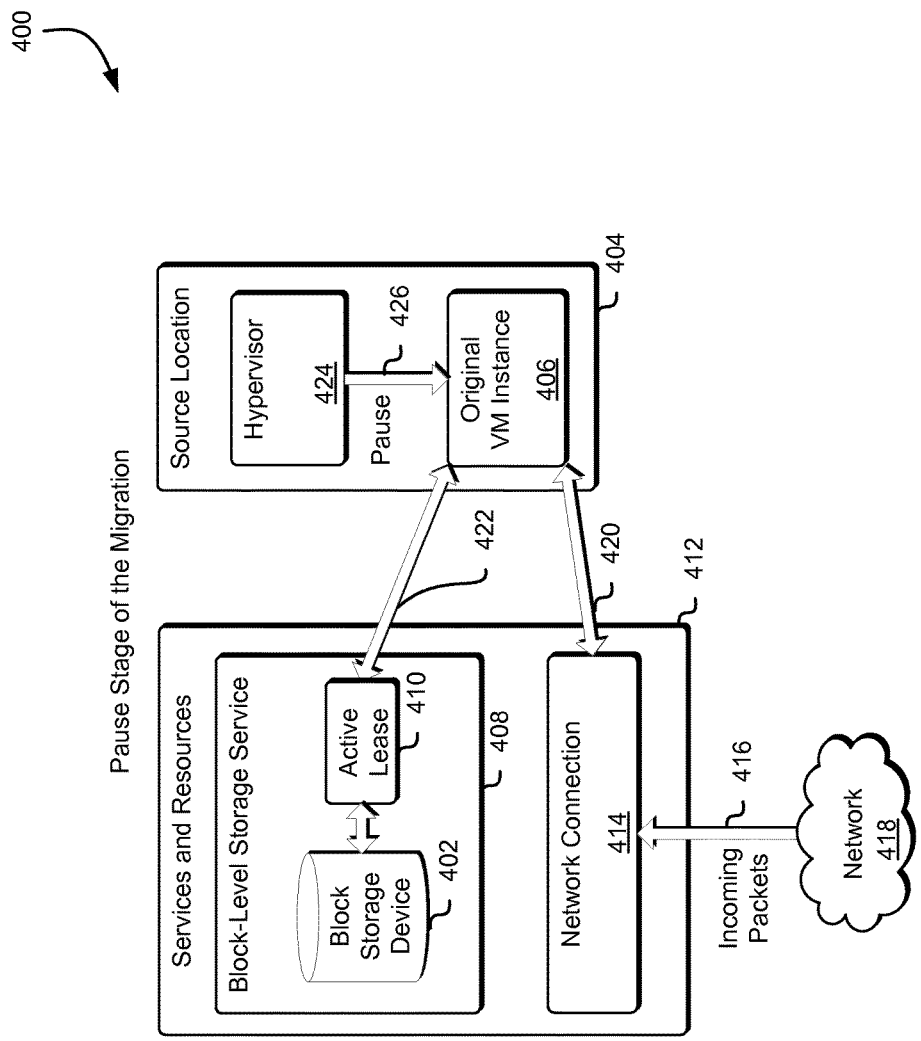
FIG. 4 illustrates an example environment where a pause stage of a virtual machine instance migration is shown.

FIG. 4 illustrates an example environment 400 where a pause stage of a virtual machine instance migration as described in connection with FIG. 1 and in accordance with at least one embodiment is shown. At the beginning of the migration, the pause stage of the migration is performed. Prior to the migration, the original VM instance 406 may be running at the source location 404 with access to a block storage device 402 provided by a block-level storage service 408. The block-level storage service 408 and/or the block storage device 402 may be one of a plurality of services and resources 412 such as those described above. The original VM instance may also have access to a network connection 414 which may also be one of the services and resources 412.

Access by the block storage device may be provided using an active lease 410 configured to provide access by the original VM instance 406 to the block storage device 402 as described below. The active lease 410 may be provided by the block-level storage service 408. In the example illustrated in FIG. 4, the active lease 410 is configured such that input-output requests received from the original VM instance 406 have responses generated and sent to the original VM instance 406 at the source location 404. The active lease 410 may be temporarily provided to the original VM instance and may be managed by the block-level storage service 408. Access to block storage devices provided by a block-level storage service is managed during migration of the virtual machine instance so that the state of the virtual machine instance and the state of the block storage devices is not impacted by the migration. Such management improvement is attained by managing access to the resources during the critical migration phase and by routing responses to input-output requests during the migration so that state is preserved.

As used herein, a "lease" may be a grant of rights and permissions to access a computer system resource. The lease may specify access (also referred to herein as an "access policy" or a "policy of access") to the computer system resource. A lease may be provided by a service (e.g., the block-level storage service 408) or by a different process, module, service, application, or system operating in conjunction with the service and implemented on one or more computer systems. The block-level storage service 408 may be implemented as a block-level storage service computer system and may, for example, be a distributed computer system operating on one or more computer systems and/or in one or more computer system environments. A lease may specify a type of access, permissions and/or credentials associated with that access, a duration of that access, or other parameters associated with access to the resource. For example, a lease may be a temporary lease that grants access to a resource for a limited or set time duration. Examples of such temporary leases are leases that assign a network address on a mobile network. Such temporary leases must typically be renewed (either manually or automatically) after a set period of time.

A lease may be provided by a service such as block-level storage service 408 to manage access to resources (i.e., the block storage devices associated with the service) and provide that access to clients such as other services, virtual machine instances, users (also referred to herein as "customers"), processes, applications, modules, systems, and the like. A lease may be granted to a client (e.g., the original VM instance 406) by the service and, thus, the client may have access to the resource for the duration of the lease. In an embodiment, a lease can be permanent in that the lease can be granted for the life of the client.

The use of a lease may also allow the service to manage its own resources by, for example, using the number and type of currently issued leases to determine whether the system is oversubscribed or is likely to become oversubscribed in the future. Additionally, by categorizing different leases by type (referred to herein as "lease status" or more simply as "status"), a service such as block-level storage service 408 may manage functionality associated with the resources of the service.

For example, an active lease of a block storage device 402 provided to a client VM instance may allow full access to send input-output requests from the client VM instance to the block storage device and may also indicate that all responses to those requests (from the block storage device) be sent to the client VM instance. Conversely, an inactive lease is a lease that may still exist, but has restricted permissions. For example, a lease of a block storage device provided to a client VM instance that has an inactive status may restrict both the sending of input-output requests from the client VM instance to the block storage device and may prevent any responses to any previously pending requests from being sent to the client VM instance. Other lease statuses may exist including, but not limited to, a standby lease that may allow sending of input-output requests from the client VM instance to the block storage device but that may indicate that all responses to those requests (from the block storage device) be sent to a different VM instance.

The lease illustrated in FIG. 4 is an active lease 410. During the pause stage of the migration, the active lease 410 remains attached 422 to the original VM instance 406 so that the original VM instance can continue sending and/or receiving input-output requests ("I/O requests") to the block-level storage service 408. Additionally, during the pause stage of the migration, the network connection 414 also remains attached 420 to the original VM instance 406 so that the original VM instance can continue sending and/or receiving network packets. In the example illustrated in FIG. 4, incoming packets 416 from the network 418 are delivered to the original VM instance 406 using the network connection 414. Although not illustrated in FIG. 4, the block-level storage service 408, the network connection 414, and/or other services and resources 412 may be managed and/or controlled by the hypervisor 424.

During the pause stage of the migration, the hypervisor 424 sends a pause command 426 to the original VM instance 406 to prepare it for the critical phase of the migration. When the original VM instance 406 receives the pause command 426, it begins to pause all execution. For example, the original VM instance may stop sending packets, may stop executing instructions, may stop sending network packets, and may perform other operations to stop execution of the original VM instance 406. In an embodiment, the hypervisor 424 may perform one or more additional operations associated with pausing the VM instance. For example, the hypervisor 424 may stop providing CPU resources to the original VM instance, or may begin intercepting packets and I/O requests to and from the instance. Additionally, during the pause stage of the migration, the migration manager may continue to copy memory from the original VM instance 406 to the new VM instance as described above. In an embodiment, a number of the aforementioned operations described herein are performed in parallel, either using separate threads, separate processors, separate systems, or a combination of the parallelizing elements.

It should be noted that in the pause stage of the migration, the pause of the original VM instance is not an atomic operation. That is, the pause consists of several operations that are performed in order in addition to the number of aforementioned operations that may be performed in parallel. Because the pause may not be an atomic operation, the migration manager and/or the hypervisor may wait until the pause is complete before proceeding to the route stage of the migration, described below.

Figure 5:
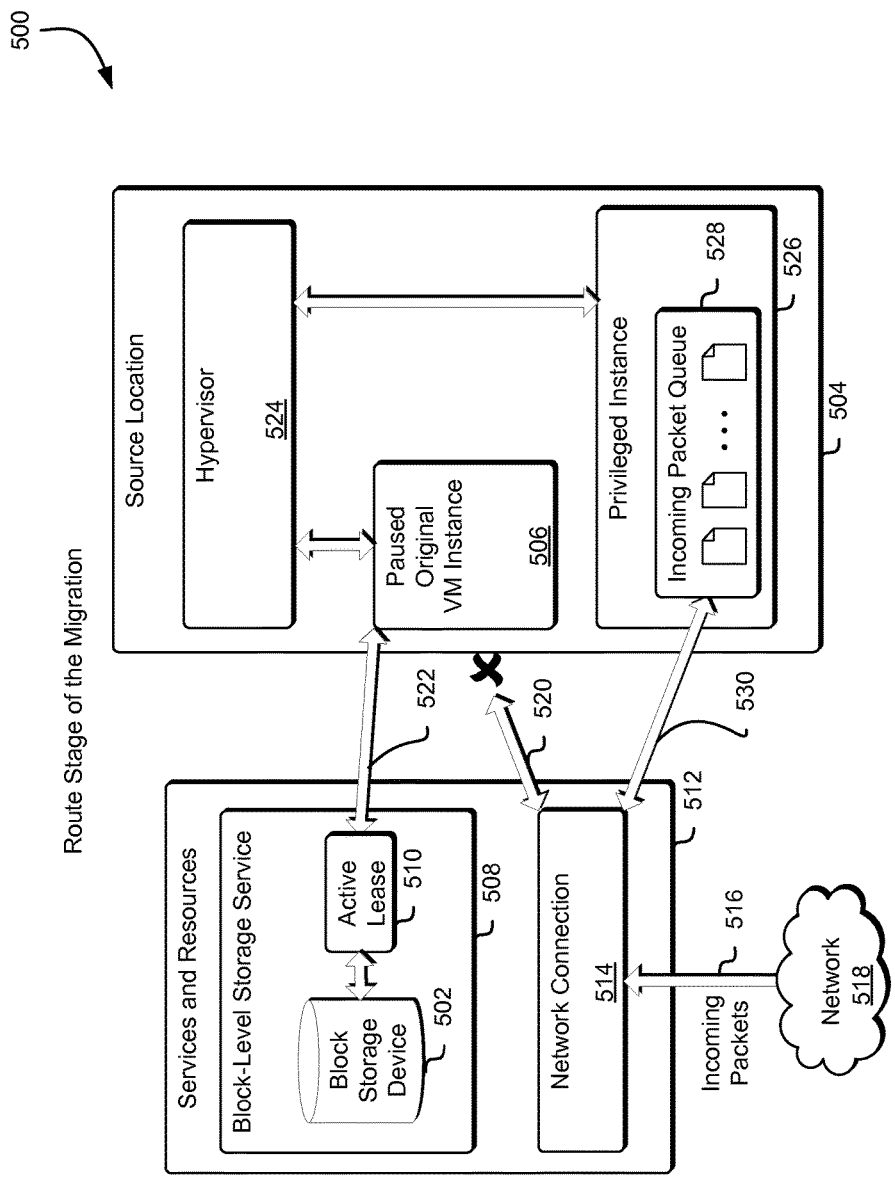
FIG. 5 illustrates an example environment where a route stage of a virtual machine instance migration is shown.

FIG. 5 illustrates an example environment 500 where a route stage of a virtual machine instance migration as described in connection with FIG. 1 and in accordance with at least one embodiment is shown. In the example illustrated in FIG. 5, the original VM instance has been paused and the paused original VM instance 506 in the source location 504 is no longer executing. The network connection 514 and the block-level storage service 508 of the services and resources 512 remain associated with the paused original VM instance 506, but because the VM instance is paused, they may be operating differently.

For example, in the route stage of the migration, the network connection 514 is reconfigured so that incoming packets 516 from the network 518 that are addressed to be sent to the original VM instance are not delivered 520 to the paused original VM instance 506. Instead, those packets are delivered 530 to the privileged instance 526 and stored in an incoming packet queue 528. In an embodiment, the incoming packets are altered by a network translation service as described above. In another embodiment, the privileged instance intercepts the network packets using the direct connection to the hardware described above. In the route stage of the migration, the network connection may duplicate the packets (i.e., may route the network packets to a plurality of locations). As used herein, unless otherwise stated or made clear from context, "routing" network packets may include both re-routing network packets to a new location as well as duplicating network packets and routing the duplicate network packets to multiple locations. In an embodiment, the incoming packets 516 from the network 518 are not delivered to the privileged instance 526, but are instead delivered directly to the hypervisor and stored in there for later delivery.

Similarly, because the original VM instance is paused, no network packets will be sent out in response to, for example, requests that were received before the original VM instance was paused. As will be described below, network packets that were waiting to be sent will be copied as part of memory copy of the original VM instance and will be sent by the new VM instance when the new VM instance is started if the migration is successful or will be sent by the original VM instance when it is restored if the migration is not successful.

Additionally, during the route stage of the migration, the active lease 510 to the block storage device 502 provided by the block-level storage service 508 is still attached 522 to the paused original VM instance 506. This does not mean that the original VM instance would be sending and/or receiving I/O requests to the block-level storage service 508. The original VM instance was paused in the pause stage of the migration and remains paused during the route stage of the migration and thus, would not be sending or receiving I/O requests. The active lease 510 remains active to ensure that the paused original VM instance 506 is the only instance with access to the block storage device 502. This maintains the state of the block storage device 502 during the critical phase (i.e., the flip stages) of the migration.

Figure 6:
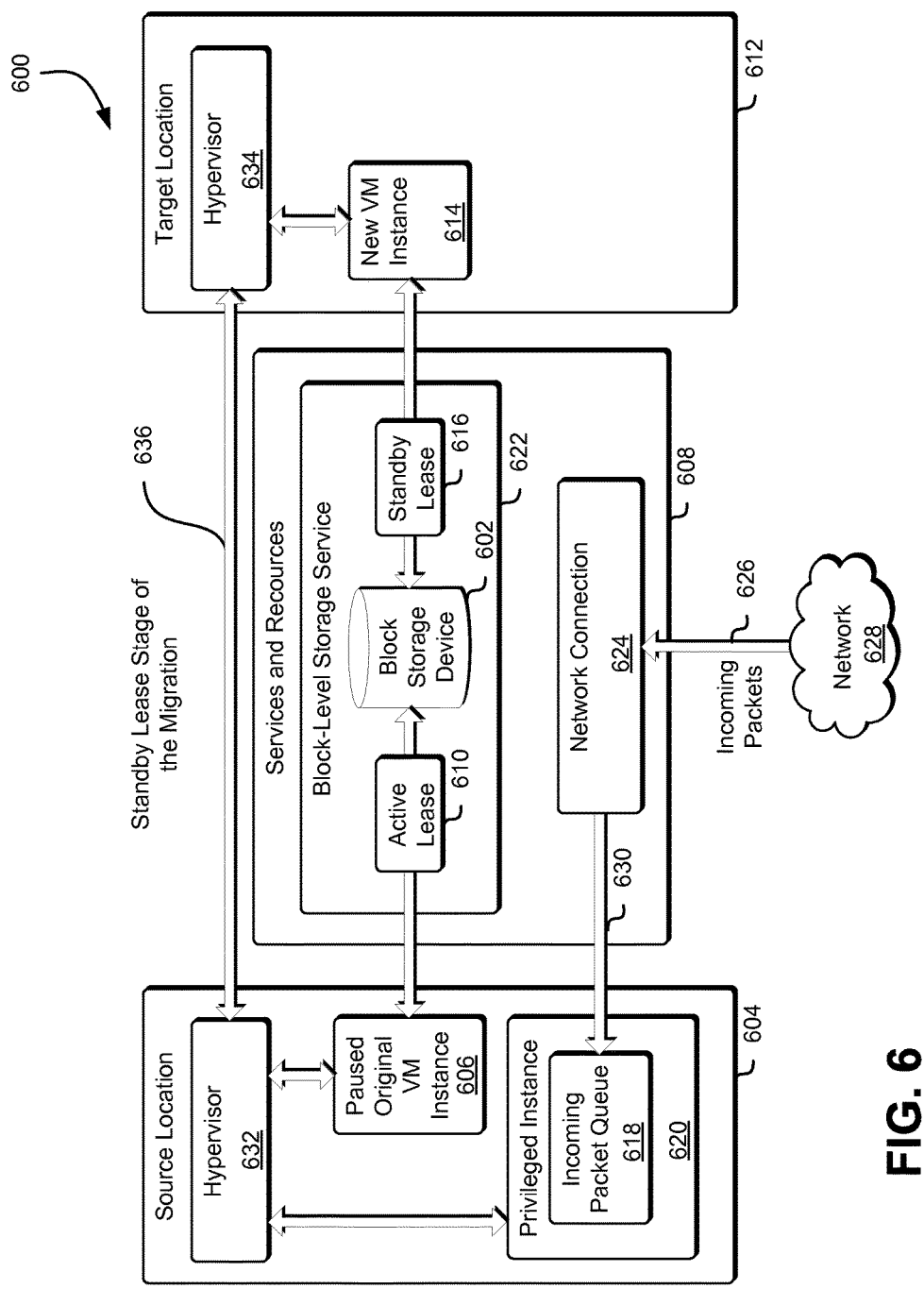
FIG. 6 illustrates an example environment where a standby lease stage of a virtual machine instance migration is shown.

FIG. 6 illustrates an example environment 600 where a standby lease stage of a virtual machine instance migration as described in connection with FIG. 1 and in accordance with at least one embodiment is shown. The standby lease stage of the migration occurs after the route stage of the migration is complete. While the pause stage of the migration and the route stage of the migration happen primarily at the source location 604, the standby lease stage of the migration happens primarily at the target location 612. The services and resources 608 are the same as the services and resources 412 described in connection with FIG. 4.

The standby lease stage of the migration is started when the hypervisor 632 at the source location 604 sends a message to the hypervisor 634 at the target location 612 that indicates that the route stage of the migration is complete. The message is sent using a connection 636 between the hypervisors as described above. In the example illustrated in FIG. 6, the paused original VM instance 606 has the active lease 610 to the block storage device 602 provided by the block-level storage service 622. The active lease 610 is configured to provide exclusive access by the paused original VM instance 606 to the block storage device 602 to maintain the state of the block storage device 602 as described above.

As a result of the preparation phase of the migration described above, a new VM instance 614 may be running in a target location 612. During the standby lease stage of the migration, the new VM instance 614 has been previously provided with a lease to the block storage device 602. In the standby lease stage, the standby lease is verified by the hypervisor, the block storage service, a network device of the source location, or a virtual network device of the VM instance. The access by the new VM instance 614 to the block storage device 602 may be provided using a standby lease 616, which may have been previously generated as described herein. The standby lease 616 may be configured to provide partial access to the block storage device 602 during the migration. For example, the standby lease 616 may be configured such that the new VM instance 614 may not generate input-output requests to the block storage device 602, but may receive responses to input-output requests generated by other VM instances (e.g., previously generated requests from the original VM instance before it was paused). In an embodiment, one or both of the active lease 610 and the standby lease 616 are temporarily provided to the respective VM instances and may be managed by the block-level storage service 622.

During the standby lease stage of the migration, any incoming packets 626 from the network 628 may continue to be routed 630 to the privileged instance 620 and stored in the incoming packet queue 618 as described above. Additionally, during the standby lease stage of the migration, memory and/or state may also continue to be copied from the paused original VM instance 606 at the source location 604 to the new VM instance 614 at the target location 612 in parallel with the standby lease stage of the migration, also as described above.

Figure 7:
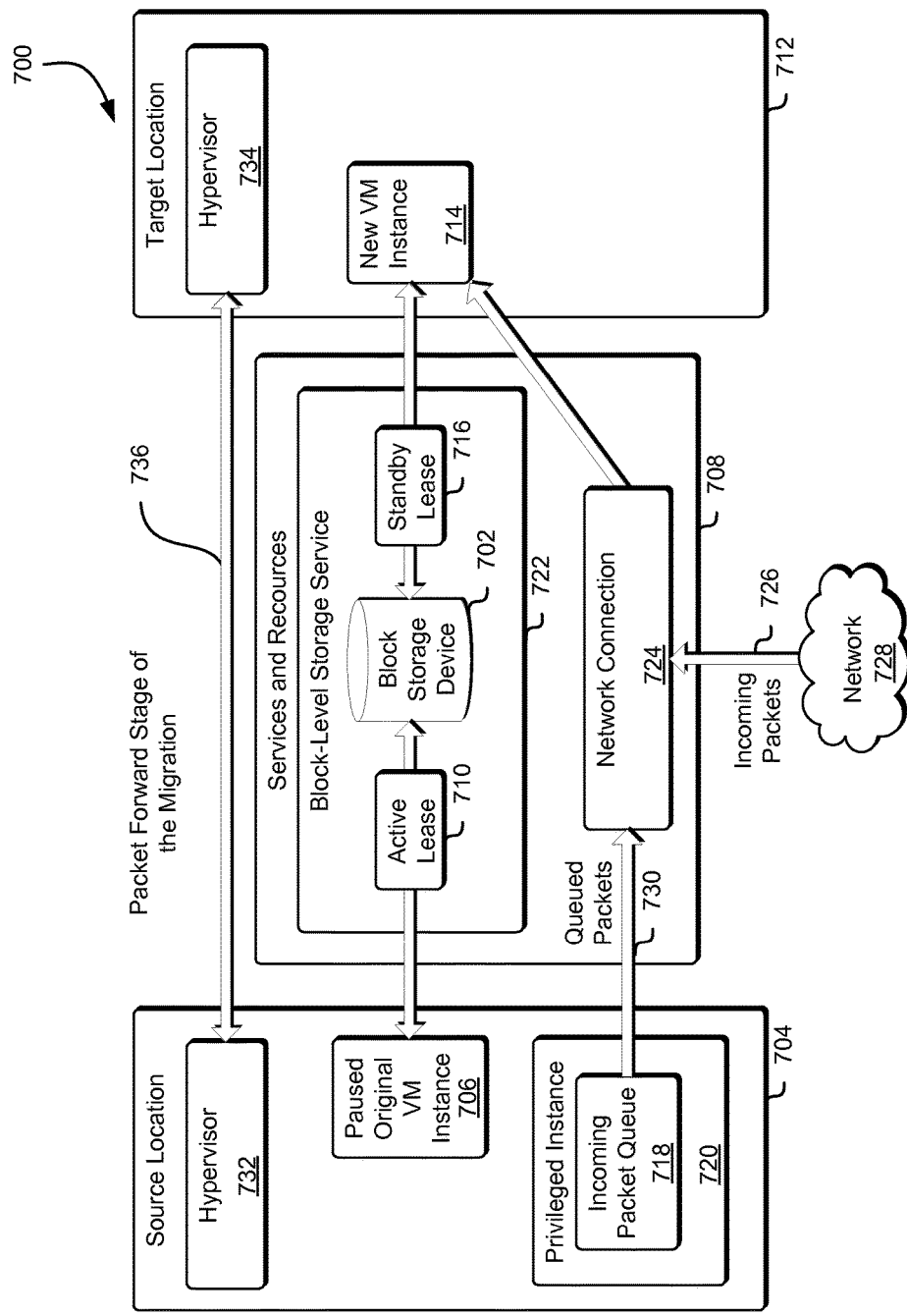
FIG. 7 illustrates an example environment where a packet forward stage of a virtual machine instance migration is shown.

FIG. 7 illustrates an example environment 700 where a packet forward stage of a virtual machine instance migration as described in connection with FIG. 1 and in accordance with at least one embodiment is shown. The packet forward stage of the migration occurs after the standby lease stage of the migration is complete. The packet forward stage of the migration happens primarily at the source location 704. As with the services and resources illustrated in FIG. 6, the services and resources 708 are the same as the services and resources 412 described in connection with FIG. 4.

The packet forward stage of the migration is started when the hypervisor 734 at the target location 712 sends a message to the hypervisor 732 at the source location 704 that indicates that the standby lease stage of the migration is complete. The message is sent using a connection 736 between the hypervisors as described above. In the example illustrated in FIG. 7, the paused original VM instance 706 still has the active lease 710 to the block storage device 702 provided by the block-level storage service 722 as described above and the new VM instance 714 at the target location 712 still has the standby lease 716 to the block storage device 702 provided by the block-level storage service 722 also as described above. Additionally, memory and/or state may also continue to be copied from the paused original VM instance 706 at the source location 704 to the new VM instance 714 at the target location 712 as described above.

In the packet forward stage of the migration, the privileged instance 720 at the source location 704 begins sending queued packets 730 from the incoming packet queue 718 to the new VM instance 714 via the network connection 724. In an embodiment, any new incoming packets 726 from the network 728 are still routed to the incoming packet queue 718 to ensure proper packet order. In such an embodiment, the new incoming packets are then sent to the new VM instance 714 as the queued packets 730 in the incoming packet queue 718 are processed. In another embodiment, the new incoming packets 726 from the network 728 are instead routed to the new VM instance 714, and are ordered accordingly using the networking protocols of the new VM instance 714. As described above, in the packet forward stage of the migration, the packets may also be duplicated (i.e., sent to multiple destinations).

Figure 8:
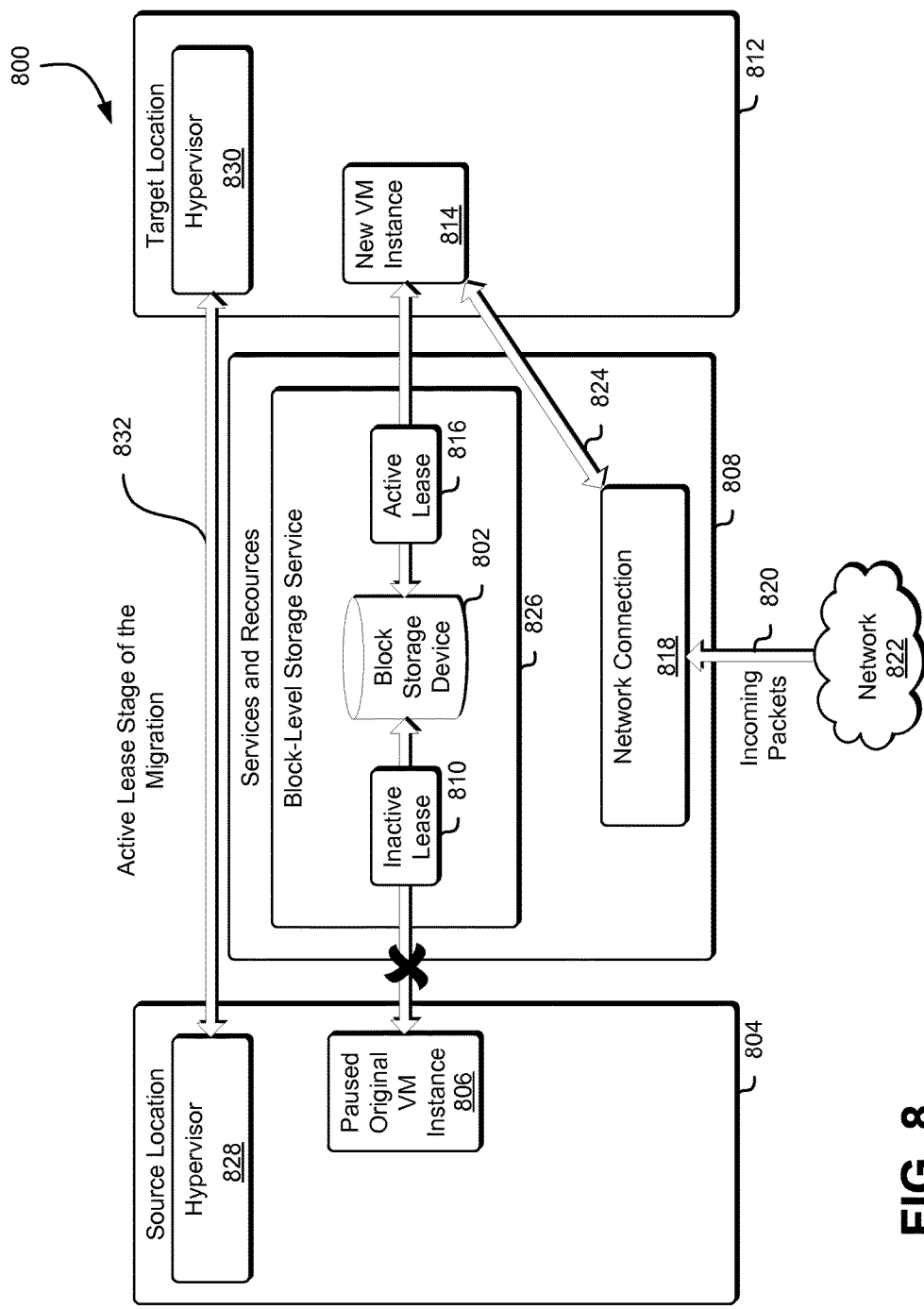
FIG. 8 illustrates an example environment where an active lease stage of a virtual machine instance migration is shown.

FIG. 8 illustrates an example environment 800 where an active lease stage of a virtual machine instance migration as described in connection with FIG. 1 and in accordance with at least one embodiment is shown. The active lease stage of the migration is the final flip stage of the critical migration phase. The active lease stage of the migration occurs after the packet forward stage of the migration is complete. The active lease stage of the migration happens primarily at the target location 812. As with the services and resources illustrated in FIGS. 6 and 7, the services and resources 808 are the same as the services and resources 412 described in connection with FIG. 4.

The active lease stage of the migration is started when the hypervisor 828 at the source location 804 sends a message to the hypervisor 830 at the target location 812 that indicates that the packet forward stage of the migration is complete. The message is sent using a connection 832 between the hypervisors as described above. In the active lease stage of the migration, the lease from the paused original VM instance 806 to the block storage device 802 provided by a block-level storage service 826 may be changed to an inactive lease 810. An inactive lease 810 may be configured to prevent access by the paused original VM instance 806 to the block storage device 802. An inactive lease prevents input-output requests from a VM instance helps to avoid synchronization issues. Additionally, any responses to previously submitted input-output requests may also be blocked to avoid synchronization issues. In an embodiment, an inactive lease represents a former and/or expired lease that is used for cleanup or other such administrative purposes, but that is not configured to transmit or receive any input-output requests to or from a VM instance.

Also in the active lease stage of the migration, the new VM instance 814 running in the target location 812 with access to the block storage device 802 provided the block-level storage service 826. The access to the block storage device 802 may be provided using an active lease 816 as described above. For example, the active lease 816 may be configured such that the new VM instance 814 may generate input-output requests to the block storage device 802, and may receive responses to those input-output requests. The responses may also have been generated as a result of input-output requests previously generated by, for example, the original VM instance before it was paused. As described previously, one or both of the inactive lease 810 and the active lease 816 may be temporarily provided to the respective VM instances and may be managed by the block-level storage service 826.

Also in the active lease stage of the migration, after all queued packets have been received from the source location 804 as described in connection with FIG. 7, the network connection 818 may be fully associated 824 with the new VM instance 814 and any new incoming packets 820 from the network 822 may be delivered to the new VM instance by the network translation service described above. In the example illustrated in FIG. 8, the packet forwarding and/or duplication described above is shown as having ceased. However, in an embodiment, the packet forwarding and/or duplication continues through the active lease stage of the migration until the migration is complete.

Figure 9:
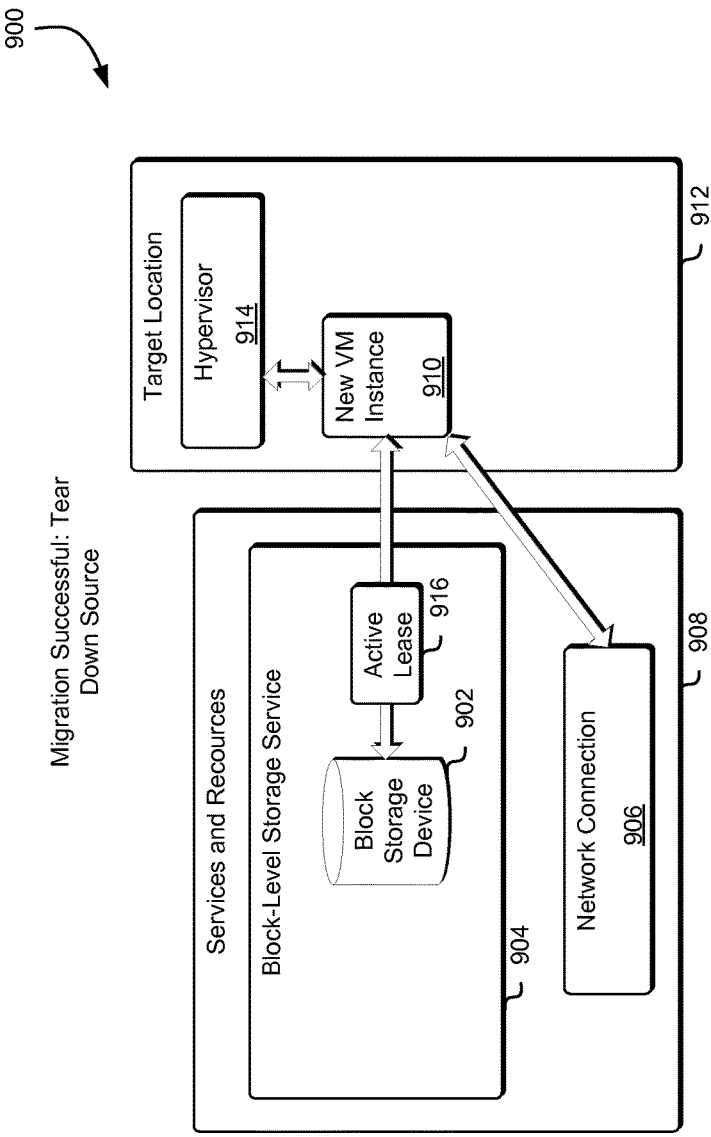
FIG. 9 illustrates an example environment where the result of a successful migration of a virtual machine instance is shown.

FIG. 9 illustrates an example environment 900 where the result of a successful migration of a virtual machine instance as described in connection with FIG. 1 and in accordance with an embodiment is shown. In the example illustrated in FIG. 9, the migration is complete and the new VM instance 910 is running at the target location 912 under the control of the hypervisor 914. The new VM instance 910 may have access to the services and resources 908 including, but not limited to, access to the block storage device 902 provided by the block-level storage service 904 using the active lease 916, and access to the network connection 906 as described above.

Figure 10:
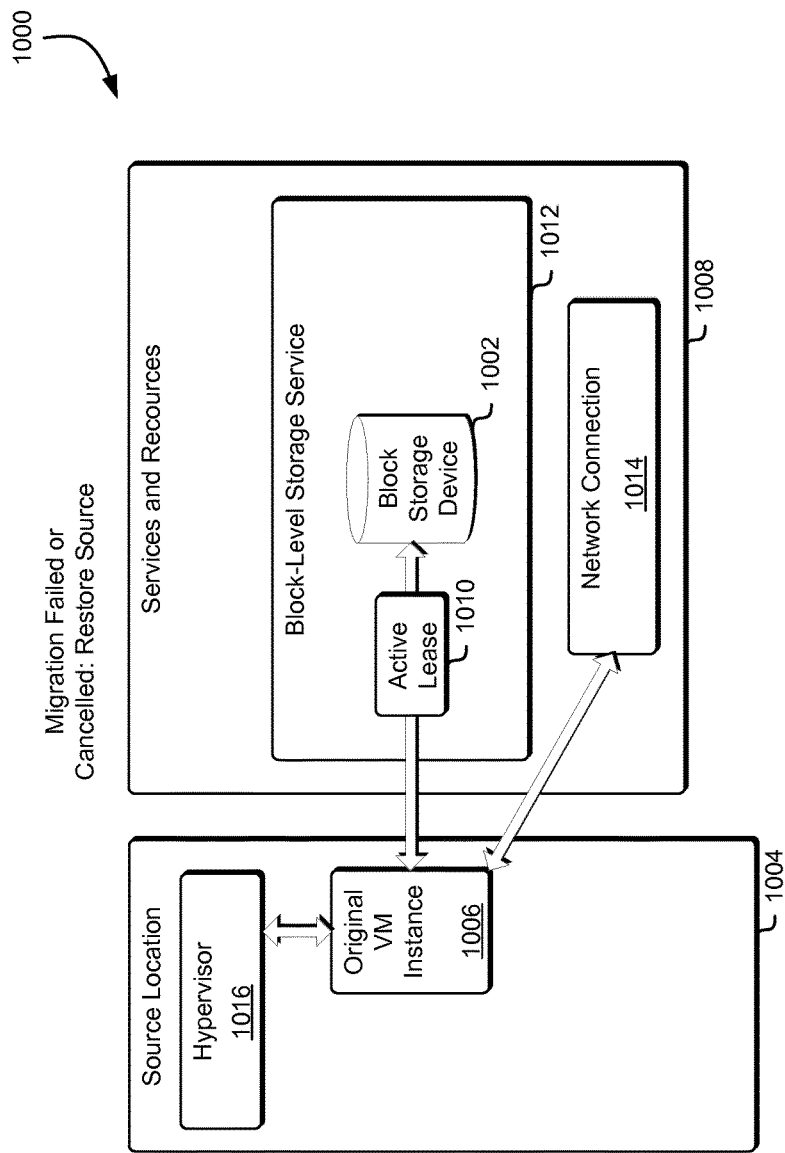
FIG. 10 illustrates an example environment where the result of an unsuccessful migration of a virtual machine instance is shown.

FIG. 10 illustrates an example environment 1000 where the result of an unsuccessful migration of a virtual machine instance as described in connection with FIG. 1 and in accordance with an embodiment is shown. In the example illustrated in FIG. 10, the migration has failed or has been cancelled, and operations to undo the migration phases have been performed. It should be noted that the migration may fail or be cancelled at any of the migration phases and/or at any of the flip stages described herein. In the example illustrated in FIG. 10, the original VM instance 1006 is running at the source location 1004 under the control of the hypervisor 1016. The original VM instance 1006 may be running as a result of all flip stages having been undone (e.g., the network connection may be restored, the queued network packets delivered to the original VM instance, and the VM instance may be unpaused). The original VM instance 1006 may also have access to the services and resources 1008 including, but not limited to, access to the block storage device 1002 provided by the block-level storage service 1012 using the active lease 1010, and access to the network connection 1014 as described above.

Figure 11:
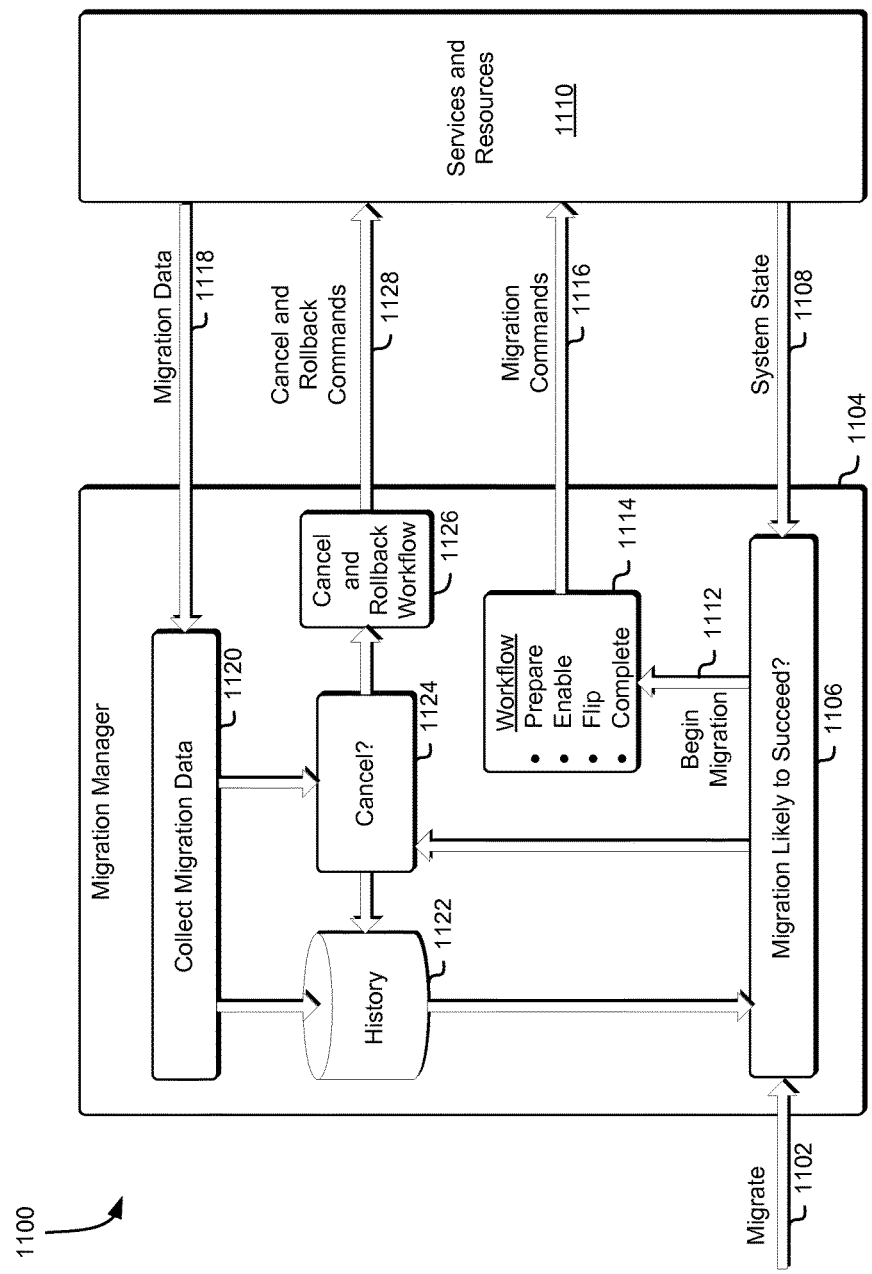
FIG. 11 illustrates an example environment where a workflow associated with the migration of a virtual machine instance is presented.

FIG. 11 illustrates an example environment 1100 where a workflow associated with the migration of a virtual machine instance is presented as described in FIG. 1 and in accordance with at least one embodiment. A request to migrate 1102 a virtual machine may be received by a migration manager 1104 as described above. In an embodiment, the migration manager determines whether the migration is likely to succeed 1106 based on an indicator of success of the migration. For example, the migration manager 1104 may determine an indicator of success of the migration by calculating a probability (e.g., between zero and one) determined from a probability model based on past migrations. The migration manager may also determine an indicator of success of the migration by examining a system state 1108 (as described herein) and determining whether a set of conditions has been satisfied and/or is likely to be satisfied. As may be contemplated, the methods of determining an indicator of success of a migration described herein are merely illustrative examples and other methods of determining an indicator of success of a migration may be considered as within the scope of the present disclosure.

The determination of the indicator of success of the migration, or whether the migration is likely to succeed 1106, may include evaluating the system state 1108 of one or more services or resources 1110. For example, if the system state 1108 indicates that a virtual machine is currently experiencing a very high volume of network or storage activity, that virtual machine may not be a good candidate for migration. The determination of whether the migration is likely to succeed 1106 may also include evaluating a migration history 1122 (also referred to herein as "migration history data") that includes results (e.g., the type of migration and whether it was successful or not) of one or more previous virtual machine migrations (also referred to herein as "previous migrations"). The migration history data may also include one or more prior system states from one or more previous migrations. For example, if the migration history 1122 indicates that a certain type of virtual machine instance is rarely successfully migrated because, for example, one of the steps times out, then that virtual machine may also not be a good candidate for migration.

As a result of determining that the migration is a good candidate for migration and, for example, that the migration is likely to succeed 1106, the migration manager 1104 may then begin the migration 1112. The migration may be based on a migration workflow 1114 that may split the migration into phases as described herein. The migration workflow 1114 may specify an order of one or more migration operations configured to, for example, prepare the target, commission the target location, flip the virtual machine, complete the migration cleanup, and/or other such migration operations. In the example illustrated in FIG. 11, the migration workflow 1114 is split into four phases: a prepare phase, a commission phase, a flip phase (including one or more flip stages as described herein), and a cleanup phase. These four phases are described in more detail herein. A migration workflow is configured so that the migration manager 1104 may determine the correct API requests and/or the order of those API requests so that the migration commands 1116 sent to the services and resource 1110 are performed in the correct order. If it is not determined that the migration is likely to succeed 1106, the migration manager may send a message indicating as such to a requestor and/or may queue the migration so that if may be attempted at a later time.

Based on the migration workflow 1114, the migration manager 1104 may begin generating migration commands 1116 to be sent to the services and resources 1110 associated with the migration. In an embodiment, the services and resources are provided by a computing resource service provider, such as the computing resource service provider 102 described in connection with FIG. 1. In another embodiment, some or all of the services and resources are provided by a customer or a third party associated with the computing resource service provider.

During the migration phases, the system state 1108 may be continually monitored by the migration manager 1104 so that, for example, spikes in resource demand may be determined. Additionally, migration data 1118 may be collected 1120 such as, for example, the length of time that migration sub-steps take to complete (e.g., how long it takes to perform a migration operation associated with a particular service or resource), whether such sub-steps succeed or fail, or possible reasons for success or failure. The migration data 1118 may be collected 1120 and stored in the migration history 1122 to inform subsequent migrations. Based on the system state 1108 and/or based on the migration data 1118, the migration manager 1104 may determine whether or not to cancel 1124 the migration before it completes. The migration manager 1104 may also determine whether or not to cancel 1124 the migration in the event of a timeout as described herein.

If it is determined to cancel 1124 the migration, the migration manager 1104 may perform the cancellation based on a cancel and rollback workflow 1126 (also referred to herein as a "cancellation workflow") that may specify the order for a set of cancellation operations and may also specify the order for a set of rollback operations. The migration manager 1104 may also direct the hypervisors to perform one or more rollback operations by, for example, issuing commands to the hypervisors and/or making one or more remote procedure calls as described herein. The hypervisors may also perform one or more rollback operations directly (i.e., without the intervention of the migration manage 1104) by, for example, executing one or more "unflip" stages as described herein. The cancellation workflow to undo the flip phase may include one or more unflip workflows that undo respective flip stages. In an embodiment, the cancel and rollback workflow 1126 is part of the migration workflow 1114 (i.e., the cancellation and rollback workflow is a subset of the set of operations that specify the migration workflow). The set of cancellation operations and the set of rollback operations, collective referred to herein as a set of cancel and rollback commands 1128 may be sent to the services and resources 1110 as a result of the cancel and rollback workflow being performed by the migration manager 1104. The decision to cancel 1124 the migration may also be stored in the migration history 1122.

The system state 1108 and/or the migration data 1118 may be used to determine whether a migration should occur as described herein, may be used to determine the best time to perform a migration, and/or may also be used to determine whether the migration is proceeding correctly. In an embodiment, the system state 1108 and/or the migration data 1118 can also be used by the migration manager 1104 to improve workflows, adjust timeouts, improve memory convergence, or to determine other parameters associated with a migration. In such an embodiment, the migration manager 1104 can include a machine learning system configured to receive the system state 1108 and/or the migration data 1118 and evaluate it against the migration history 1122 to improve workflows, adjust timeouts, improve memory convergence, or to determine other parameters associated with a migration. The machine learning system may also be configured to improve determinations about when and how to cancel a migration and/or to improve determinations about which migrations are especially good (or especially bad) candidates. Additionally, although not illustrated in FIG. 11, the system state 1108 may also be used in conjunction with the migration workflow 1114 to, for example, alter the workflow, make workflow decisions (e.g., to perform certain actions in response to changes in the system state 1108), or to execute workflow steps such as, for example, to perform cleanup, cancel, or rollback operations associated with the migration.

Figure 12:
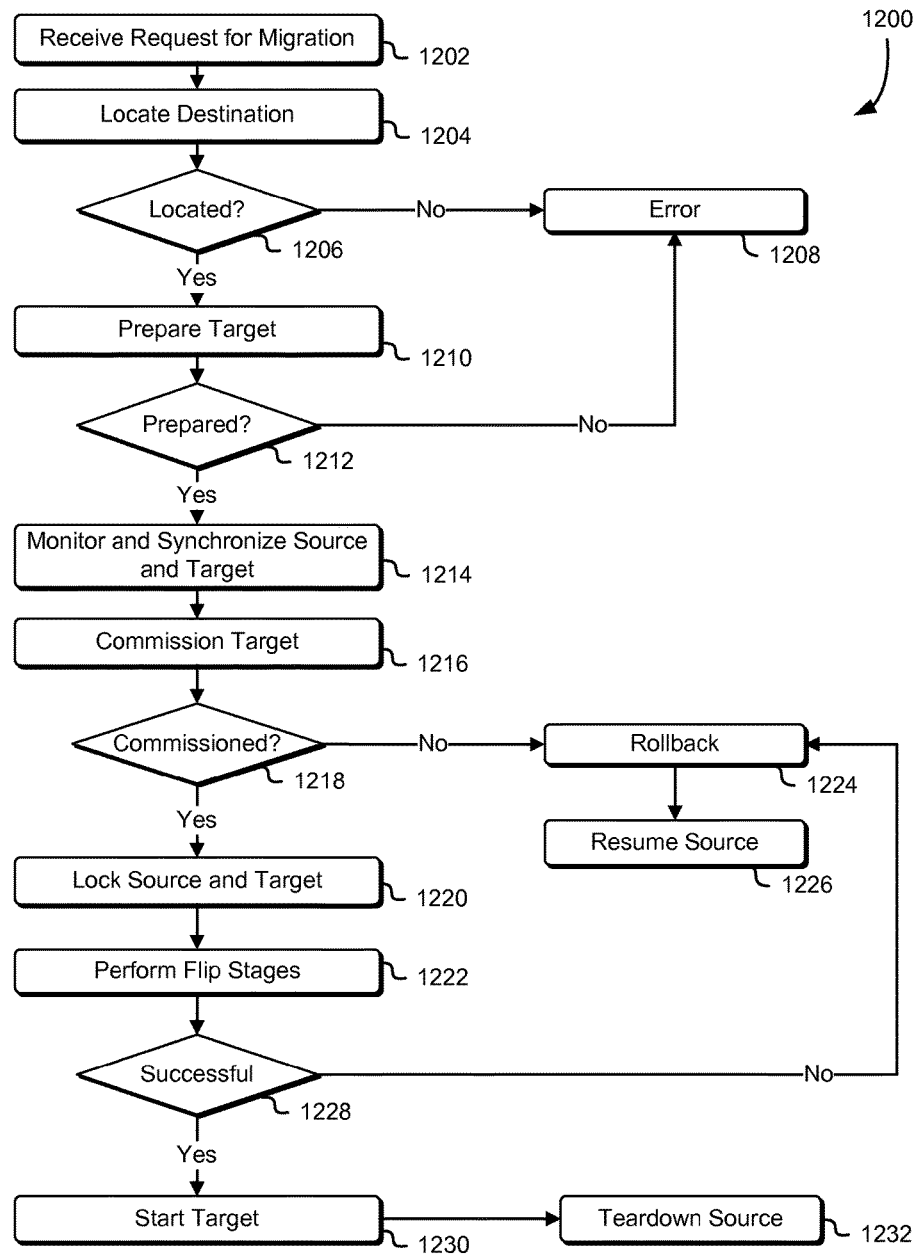
FIG. 12 illustrates an example process for managing the phases of a virtual machine instance migration.

FIG. 12 illustrates an example process 1200 for managing the phases of a virtual machine instance migration as described in FIG. 1 and in accordance with at least one embodiment. A migration manager, such as the migration manager 104 described in connection with FIG. 1, may perform at least a part of the process illustrated in FIG. 12. Additionally, one or more hypervisors such as the hypervisor 208 and the hypervisor 222 described in connection with FIG. 2 may perform at least a part of the process illustrated in FIG. 12.

A migration manager may first receive a request to perform a migration 1202 of a virtual machine instance. The migration manager may then locate a target 1204 to which the virtual machine instance may be migrated. The migration manager may locate the target based on resource availability, proximity to a customer, proximity to system resources, resource cost, or other such considerations. In an embodiment, a representation of the desired capabilities can be generated as, for example, a hash representation of the parameters of the desired capabilities. These parameters may include the size of the virtual machine instance, the type of processor or processors needed, the amount of memory, an operating system version, and/or software versions desired. The desired capabilities may be communicated to a virtual machine service using one or more API requests, or may be communicated to a virtual machine service as a set (i.e., in bulk or batches).

The migration manager may also direct another component such as a system manager to locate a target 1204 to which the virtual machine instance may be migrated. The migration manager and/or the system manager may also direct a third system or service to locate a target 1204 to which the virtual machine instance may be migrated. For example, the migration manager may generate a request for a target based on the desired capabilities of the target (e.g., type of CPU, type of hypervisor, installed software, associated hardware, etc.) and may send this request to the system manager. The system manager may then forward this request to a virtual machine service that may be configured to provide a set of one or more candidate targets in response to that request based on the desired capabilities. The system manager may then choose a subset of the set of one or more candidate targets and may provide that subset to the migration manager. As may be contemplated, the methods and systems for locating a target to which the virtual machine instance may be migrated that are described herein are merely illustrative examples, and other methods and systems for locating a target to which the virtual machine instance may be migrated may be considered as within the scope of this disclosure.

If it is not the case that a target is located 1206, then the migration manager may generate an error 1208 and send it to the requester of the migration. In addition to generating an error, the migration manager may also queue the request for migration for later processing. If is the case that a target is located 1206, the migration manager may begin to prepare the target 1210. The migration manager may begin to prepare the target 1210 by, for example, generating one or more API requests to the target to reserve and/or create a location for the virtual machine instance (the location may also be referred to herein as a "slot") to reserve hardware and/or other resources associated with the virtual machine instance, and/or to instantiate a base virtual machine instance that may be used to migrate the virtual machine instance.

While it is not shown in the process illustrated in FIG. 12, the migration manager may determine to cancel the migration at several points during the process. For example, while the migration continues to prepare the target 1210, the migration manager may determine that the migration is not likely to succeed as described above. At this determination, the migration manager may cancel the migration and request an abort of the migration, which may cause the hypervisors to perform any rollback necessary to return the system to a known state. Similarly, the migration manager may determine to cancel the migration if part of the process of preparing the target 1210 takes too long, or if maintaining the synchronization between the virtual machine instance at the source and the virtual machine instance at the target becomes too costly. The migration manager may also cancel the migration at other steps of the process illustrated in FIG. 12 such as, for example, before the lock of the source, during the lock of the source, during the commission of the target location, during the flip from the source to the target, or after the flip from the source to the target has completed.

If it is not the case that the target is prepared 1212, the migration manager may generate an error 1208 and send it to the requester of the migration. In addition to generating an error, the migration manager may also queue the request for migration for later processing. Because the migration is in initial stages, the migration may merely stop at this phase, perform any cleanup of the migration, and allow the virtual machine instance at the source to continue operation. In an embodiment, the migration manager can perform a rollback and restore operation such as those described herein. In addition to performing any cleanup, rollback, and restore operations, the migration manager may also queue the request for migration for later processing. If is the case that the target is prepared 1212, the migration manager may then begin monitoring and synchronizing the source and target 1214 as described herein.

The migration manager may then commission the VM instance in the target location 1216 (also referred to herein simply as "commission the target location"). The migration manager may commission the VM instance in the target location by performing a process or workflow comprising a set of operations that prepare the target location to load an image of the virtual machine instance and to execute the virtual machine image. The migration manager may also perform additional operations associated with the commission of the target location 1216 (e.g., in addition to those described herein) including, but not limited to, provisioning the VM instance, attaching resources to the VM instance, verifying the VM instance, or executing one or more additional processes using the VM instance after the VM instance is executing.

The migration manager may commission the target location 1216 by, for example, verifying the target, creating interfaces for the virtual machine instance at the target, requesting that storage and network resources be associated with or attached to virtual machine instance at the target, requesting that credentials be associated with the virtual machine instance at the target, requesting that the virtual machine instance be launched at the target, and causing the hypervisor to copy memory and state from the virtual machine instance at the source to the virtual machine instance at the target. This copying of memory and state from the virtual machine instance at the source to the virtual machine instance at the target may be performed while the virtual machine instance at the source is still running. This may require the hypervisors to track changes made to the virtual machine instance at the source and to propagate those changes to the virtual machine instance at the target during and/or after the copy.

In an embodiment, the migration manager will commission the target location 1216 by providing packet forwarding from the source to the target. This packet forwarding will allow the virtual machine instance at the source to continue receiving data packets from services and/or resources and to forward those data packets to the virtual machine instance at the target. This packet forwarding may also allow both virtual machine instances to send and receive data on behalf of the other, thereby retaining connections with the external services and/or resources associated with the virtual machine instances during the migration. For example, an I/O request from the virtual machine instance at the source to a block storage service may receive a response to that request during migration. The response may be received at the virtual machine instance at the source and then forwarded to the virtual machine instance at the target. Further actions based on that response may be performed by the source or may be performed by the target reporting to the source (i.e., so that an error is not generated). Such packet forwarding may continue throughout the migration.

The migration manager may determine that the process to commission the target location 1216 has completed after one or more conditions are met. For example, when all API requests associated with the process to commission the target location 1216 have been issued, all responses have been received from the services and/or resources, and no further data is expected. In an embodiment, the migration manager will wait for one or more systems to reach a known state (also referred to herein as "converging") before determining that the process to commission the target location 1216 has completed. The migration manager may also determine that the process to commission the target location 1216 has completed if there is an error, or if there is a timeout, or if it becomes apparent that the migration will not succeed.

Upon completion of the process to commission the target location 1216, if the process has not completed successfully 1218, the migration manager may begin a rollback 1224 (which may include not initiating a migration) and, after the rollback may resume the virtual machine instance at the source 1226. In addition to generating an error 1208, the migration manager may also queue the request for migration for later processing as described above. Conversely, upon completion of the process to commission the target location 1216, if the process has completed successfully 1218, the migration manager may proceed to the lock of the source and target 1220 by, for example, locking a virtual machine abstraction associated with the migration.

When the migration manager locks the virtual machine instance 1214 at the source and the virtual machine instance at the target by locking a virtual machine abstraction, this lock to the virtual machine instances may prevent any entity from performing any actions on the virtual machine instances that may substantially alter the virtual machine instance (also referred to herein as "mutating" the virtual machine instance). Examples of operations that may be prevented by the lock are adding storage volumes to the virtual machine instance, changing the network interface of the virtual machine instance, stopping the virtual machine instance, or other such actions. The lock may prevent all such actions or may prevent some and allow others. The lock may also generate warnings and/or errors to the user so that the user may determine whether to override (or ignore) the lock.

After the lock, the migration manager may then proceed to the flip stages 1222. Although not illustrated in FIG. 12, the migration manager may perform one or more operations prior to the flip stages 1222 to begin cleanup after the migration. For example, in the event that the migration will not complete successfully (e.g., failing either at the prepare phase or at the commission phase), the migration manager may have completed a number of operations associated with the migration. To facilitate cleanup, the migration manager may store a stack of operations performed, so that the stack of operations may be used in the subsequent cleanup. Similarly, the migration manager may perform steps during the migration to clean up certain operations if, for example, the changes associated with those operations are no longer required for the migration. Such operations that may be cleaned early may include temporary storage of files, temporary access to resources, or other such operations. It should be noted that the stack of operations that occur during the migration grows as the migration progresses so that, at the flip stages 1222, the amount and complexity of the operations that may need to be rolled back in the rollback 1224 may be the largest and/or the most complex and may involve one or more unflip operations to undo the flip stages at the source and/or at the target.

In an embodiment, the migration manager will lock the source and target virtual machine instances at an earlier time such as, for example, before the commission of the target location 1216. In another embodiment, the migration manager will delay the lock of the source and target virtual machine instances as late as possible in the migration process, and wait until after the commission of the target location 1216, or delay until after the flip stages 1222 have begun. This delayed locking (also referred to herein as "optimistic" locking) minimizes the time that a user may be unable to interact with a virtual machine instance that has been selected for migration by keeping the virtual machine unlocked during the commission phase.

Optimistic locking, described in detail below, may be accomplished by categorizing changes that may be received at the running virtual machine instance into whether or not they introduce changes, whether those changes are changes to the user visible abstraction of the virtual machine instance or to the domain (i.e., the actual virtual machine instance as instantiated), and whether those changes can be blocked by the migration manager. Each time changes are received that change the virtual machine instance, a version number for the virtual machine instance is incremented. Each time changes are received that change the domain, a version number for the domain may be incremented. If, during the migration, the version numbers diverge from where they were at the beginning of the migration, the migration manager may either attempt to synchronize the changes, block the changes to the source so that they may be applied to the target after migration, or cancel the migration. Version numbers are described in more detail below. In an embodiment, the migration manager will optimize for cancelling the migration, thus minimizing disruption of the customer experience.

As described above, if it is determined that, upon completion of the process to commission the target location 1216, if the process has completed successfully 1218, and the source and target are locked, the migration manager may proceed to the flip stages 1222. The migration manager and/or the hypervisors may perform one or more operations prior to the flip stages 1222 such as, for example, verifying that a substantial portion of the memory and/or state has been copied from the virtual machine instance at the source to the virtual machine instance at the target, verifying all interfaces and resources are correctly attached to the virtual machine instances, verifying that the remaining memory and/or state changes are sufficiently minor as to be quickly propagated to the virtual machine instance at the target, and readying any resources for the final transition from the virtual machine instance at the source to the virtual machine instance at the target.

After the flip stages 1222, the migration manager may then determine whether the flip of the virtual machine instance was a success 1228. The migration manager may determine that the virtual machine instance was successfully flipped from the source to the target if the memory and/or state (collectively referred to herein as the "instance state") of the virtual machine instance at the target is sufficiently the same as the instance state of virtual machine instance at the source, such that difference between the instance state of the virtual machine instance at the target and the instance state of the virtual machine instance at the target is less than a threshold value. The difference between the instance state of the virtual machine instance at the target and the instance state of the virtual machine instance at the target may be determined by, for example, computing a hash value of one or more parameters specified within the respective instance states and comparing those hash values.

If it is not the case that the flip of the virtual machine instance was a success 1228, the migration manager may perform one or more operations to rollback 1224 the migration as described herein, and may resume the virtual machine instance at the source 1226 so that the virtual machine instance at the source may continue to operate. If it is not the case that the virtual machine instance was successfully flipped from the source to the target, the migration manager may also generate an error such as the error 1208 as described above and send it to the requester of the migration. In addition to generating an error, the migration manager may also queue the request for migration for later processing.

If it is the case that the flip of the virtual machine instance was a success 1228, the migration manager may start the virtual machine instance at the target 1230 and may complete the teardown of the source 1232 as described herein, so that the virtual machine instance at the target may operate in place of the virtual machine instance at the source, thus completing the successful migration. In an embodiment, the migration manager will unlock the virtual machine instance at the source prior to the teardown of the source 1232 to allow any blocked or pending mutating changes to proceed. These blocked or pending mutating changes may also be propagated to the virtual machine instance at the target via the packet forwarding. The teardown of the source 1232 may remove duplicate network mapping, may remove redundant block storage connections, and may terminate connections with other services and/or resources. The migration manager may ensure that all connections have converged (i.e., reached a known good state) prior to the teardown of the source 1232.

Figure 13:
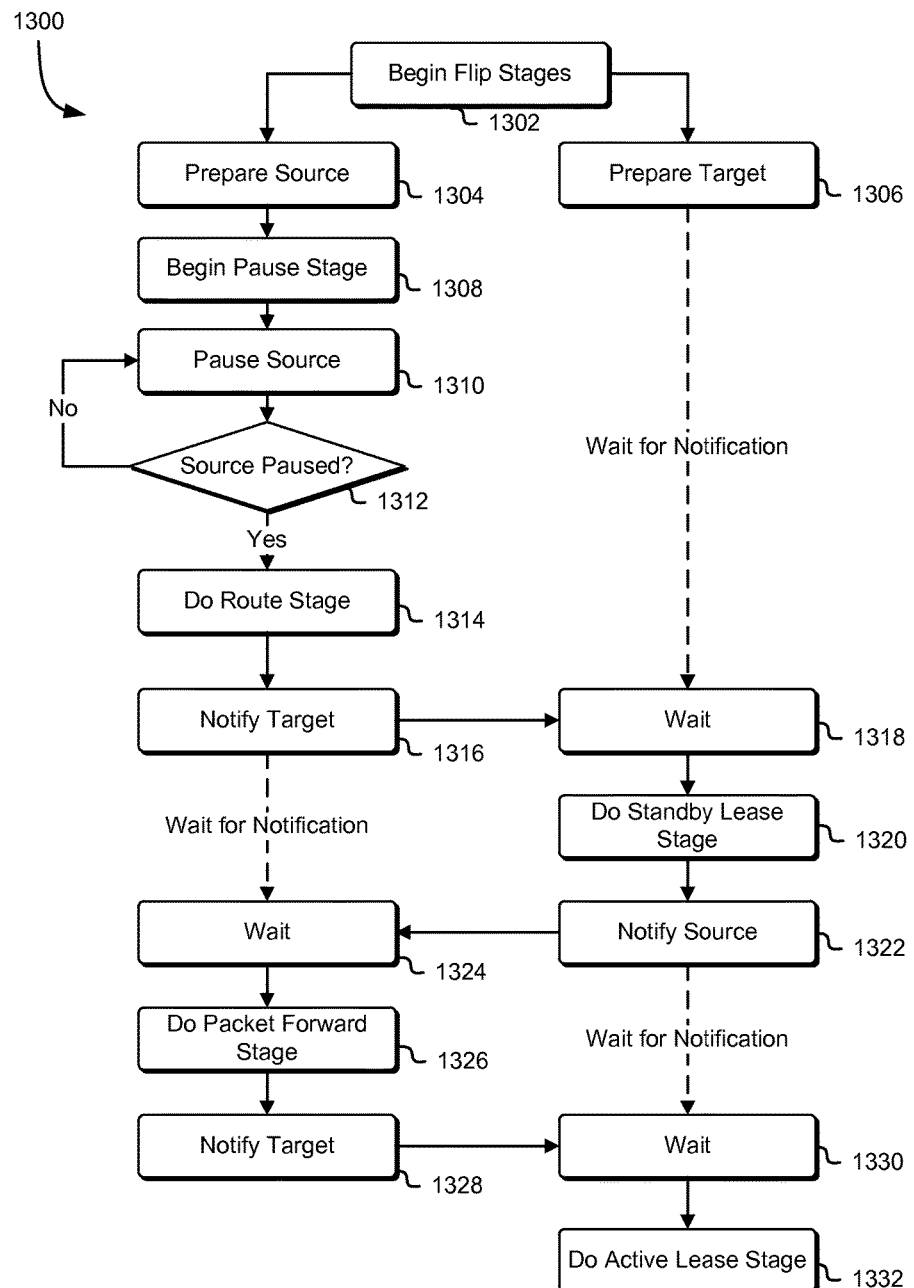
FIG. 13 illustrates an example process for managing the flip stages of a virtual machine migration.

FIG. 13 illustrates an example process 1300 for managing the flip stages of a virtual machine migration as described in connection with FIG. 1 and in accordance with an embodiment. A migration manager, such as the migration manager 104 described in connection with FIG. 1, may initiate the process illustrated in FIG. 12 as part of a migration as described herein. One or more hypervisors such as the hypervisor 208 and the hypervisor 222 described in connection with FIG. 2 may perform the process illustrated in FIG. 12.

The migration manager sends a command to begin the flip stages 1302. A hypervisor running at the source location may prepare the source 1304 for the flip stages while a hypervisor running at the target location may prepare the target 1306 for the flip stages. Because the flip stages begin at the source, the hypervisor running at the target location may wait for a notification to proceed, as indicated by the dashed line between prepare the target 1306 and wait 1318 for a notification from the hypervisor running at the source location.

The hypervisor running at the source location may begin the pause stage of the migration 1308, which includes pausing the source VM instance 1310 as described in connection with FIG. 4. Because the source must be completely paused before beginning the route stage of the migration, the hypervisor running at the source location may wait 1312 for the source to be paused before proceeding to the route stage of the migration.

When the pause stage of the migration is complete and the source is paused, the hypervisor running at the source location may then begin the route stage of the migration 1314 as described in connection with FIG. 5. Once the route stage of the migration is complete, the hypervisor running at the source location may then notify the hypervisor running at the target location 1316 that the route stage of the migration is complete. The hypervisor running at the source location may then wait for a notification to proceed, as indicated by the dashed line between notify the hypervisor running at the target location 1316 and wait 1324 for a notification from the hypervisor running at the target location.

After receiving the notification from the hypervisor running at the source location, the hypervisor running at the target location may then begin the standby lease stage of the migration 1320 as described in connection with FIG. 6. After the standby lease stage of the migration is complete, the hypervisor running at the target location may then notify the hypervisor running at the source location 1322 that the standby lease stage of the migration is complete. The hypervisor running at the source location may then wait for a notification to proceed, as indicated by the dashed line between notify the hypervisor running at the source location 1322 and wait 1330 for a notification from the hypervisor running at the source location.

After receiving the notification from the hypervisor running at the target location, the hypervisor running at the source location may then begin the packet forward stage of the migration 1326 as described in connection with FIG. 7. The packet forward stage of the migration is the final flip stage at the source location, so after the packet forward stage of the migration is complete, the hypervisor running at the source location may then notify the hypervisor running at the target location 1328 that the packet forward stage of the migration is complete. When the packet forward stage of the migration is complete, the hypervisor running at the source location may end the process after notifying the hypervisor running at the target location 1328 that the packet forward stage of the migration is complete.

After receiving the notification from the hypervisor running at the source location, the hypervisor running at the target location may then begin the active lease stage of the migration 1332 as described in connection with FIG. 8. The active lease stage of the migration is the final flip stage at the target location and is also final flip stage of the critical migration phase. In some embodiments, after the active lease stage of the migration is complete, the hypervisor running at the target location notifies the hypervisor running at the source location that the flip stages are complete.

It should be noted that the hypervisor running at the source location may and/or the hypervisor running at the target location may terminate the process illustrated in FIG. 13 and may perform one or more unflip operations if the migration and/or any of the flip stages is cancelled or fails as described above. Additionally, the unflip stages may be performed as a result of a timeout of a stage (e.g., that the execution of the stage takes too long), due to the loss of a notification of the completion of a stage, either from the source to the target or from the target to the source, or due to the failure of a verification and/or validation step of a flip stage.

Figure 14:
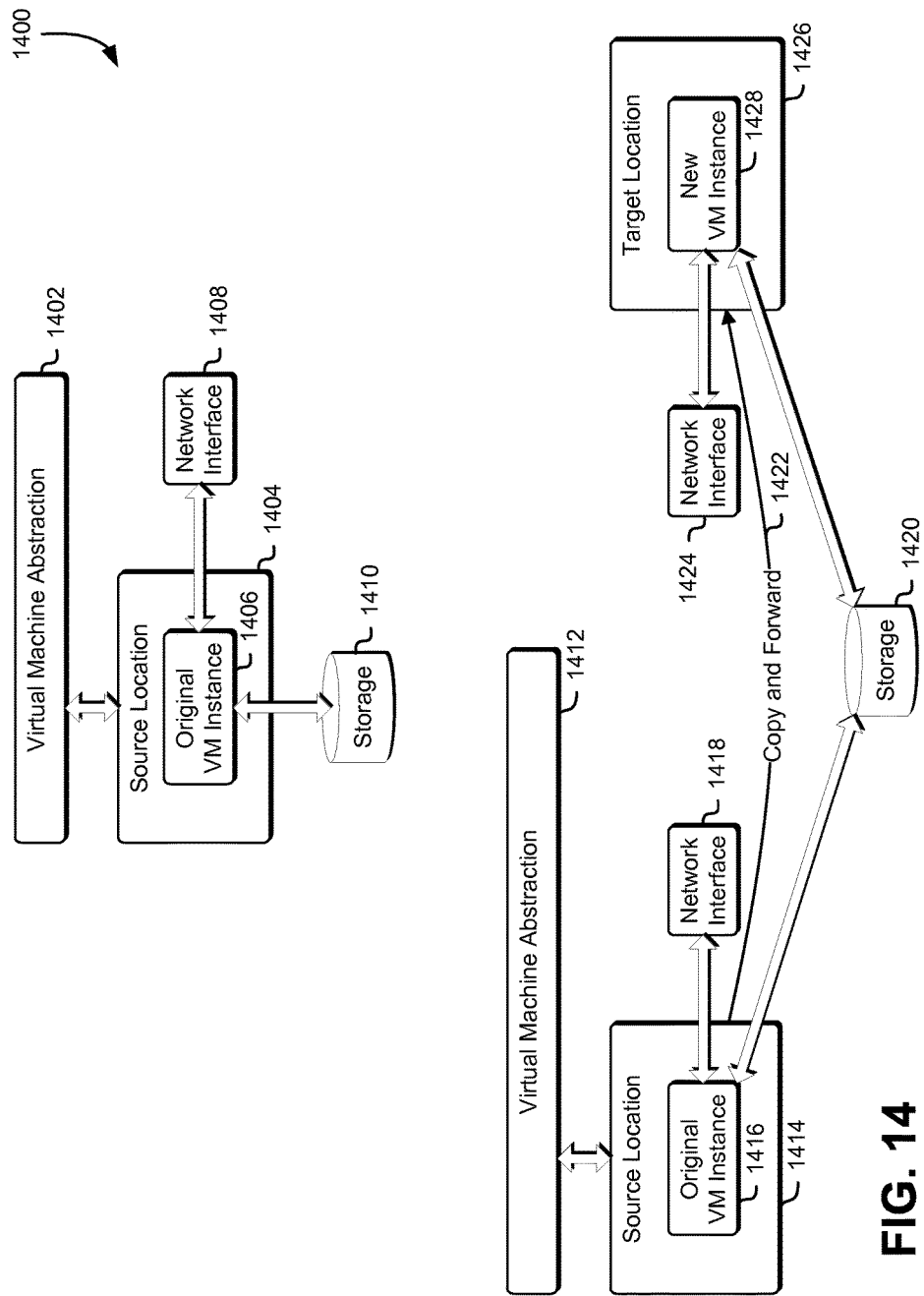
FIG. 14 illustrates an example environment where resources associated with a virtual machine instance migration are managed.

FIG. 14 illustrates an example environment 1400 where resources associated with a virtual machine instance migration are managed as described in FIG. 1 and in accordance with at least one embodiment. The example environment 1400 represents the first part of a migration, such as the migration described herein. A user may have access to a virtual machine abstraction 1402 backed by an original VM instance 1406 at a source location 1404. The original VM instance 1406 may include a network interface 1408 and one or more storage locations 1410. During migration, the user may have the same access to a virtual machine abstraction 1412 backed by the original VM instance 1416 at a source location 1414. The original VM instance 1416 may still include a network interface 1418 and one or more storage locations 1420, but the network interface 1418 may be shared with a new VM instance 1428 at a target location 1426 and/or may be duplicated as the network interface 1424.

The network interface 1418 and the network interface 1424 may be the same network interface from the perspective of the virtual machine abstraction and/or the user, and the migration manager may manage which is the active interface and which is the standby interface during the course of the migration. For example, prior to the flip, the network interface 1418 may be the active interface and the network interface 1424 may be the standby interface. After the flip, the network interface 1418 may be the standby interface and the network interface 1424 may be the active interface. Additionally, the one or more storage locations 1420 may be shared between the original VM instance 1416 and the new VM instance 1428. During migration, memory and/or state information may be copied and forwarded 1422 from the original VM instance 1416 to the new VM instance 1428 as described herein.

Figure 15:
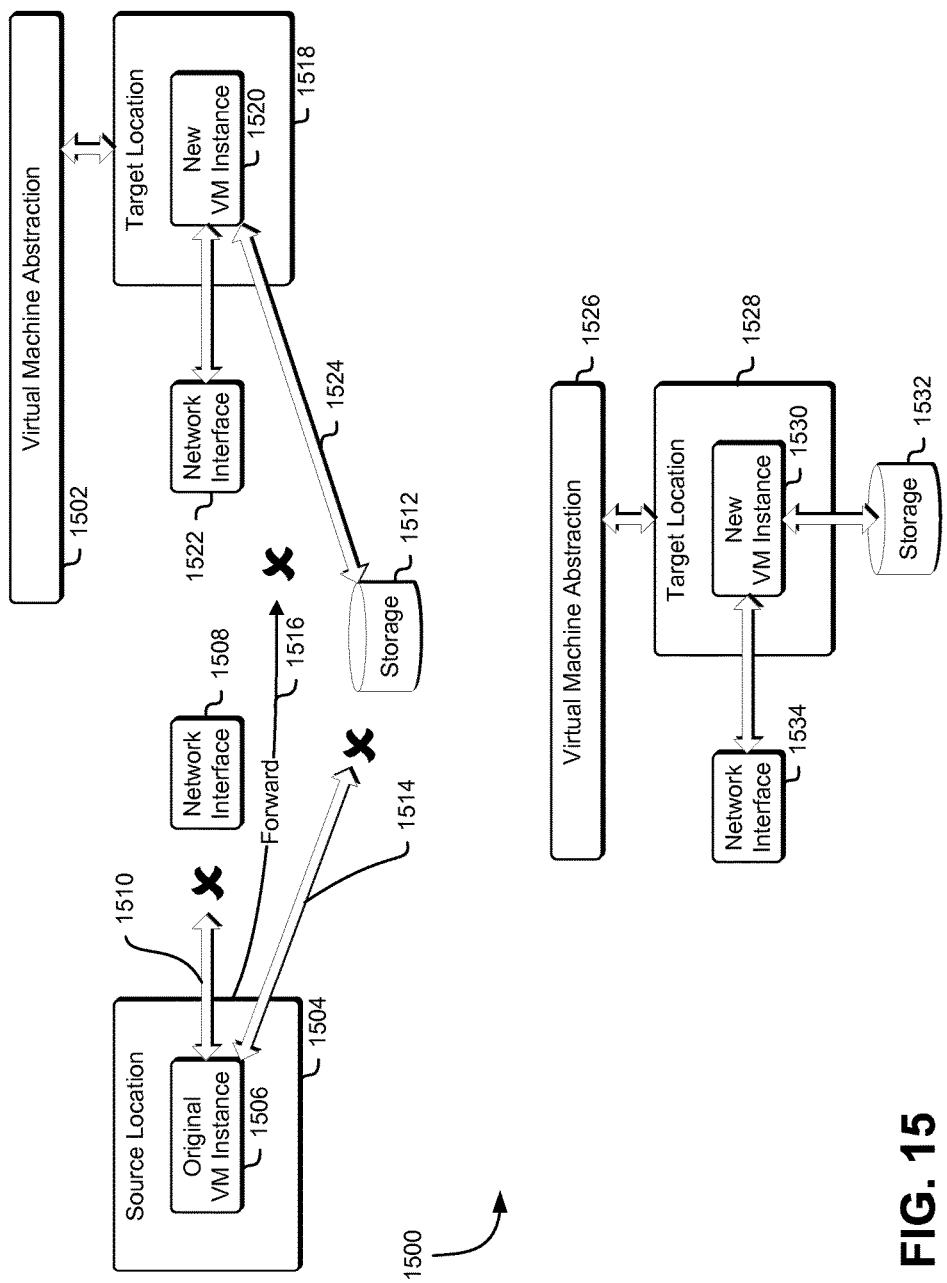
FIG. 15 illustrates an example environment where resources associated with a virtual machine instance migration are managed.

FIG. 15 illustrates an example environment 1500 where resources associated with a virtual machine instance migration are managed as described in FIG. 1 and in accordance with at least one embodiment. The example environment 1500 represents the second part of a migration such as the migrations described herein. A user may have access to a virtual machine abstraction 1502, but because the migration is reaching completion, the virtual machine abstraction 1502 may be backed by a new VM instance 1520 at a target location 1518. The new VM instance 1520 may have a network interface 1522 (which may be the same as the network interface 1508 as described above in connection with FIG. 14) and may have access 1524 to one or more storage locations 1512. The network interface 1508 may be the active network interface and the network interface 1522 may be the standby network interface. Meanwhile, the original VM instance 1506 at the source location 1504 may be in the process of being torn down. For example, the connection 1510 to the network interface 1508 may be terminated, the connection 1514 to the one or more storage locations 1512 may be removed, and the packet forwarding 1516 from the original VM instance to the new VM instance may be stopped after the original VM instance 1506 has converged.

After the successful migration, the user may have access to a virtual machine abstraction 1526 backed by the new VM instance 1530 at the target location 1528. Except for the different location, this new VM instance 1530 should appear to be the same as the original VM instance 1406 described in connection with FIG. 14, with a new active network interface 1534 and access to one or more storage locations 1532.

Figure 16:
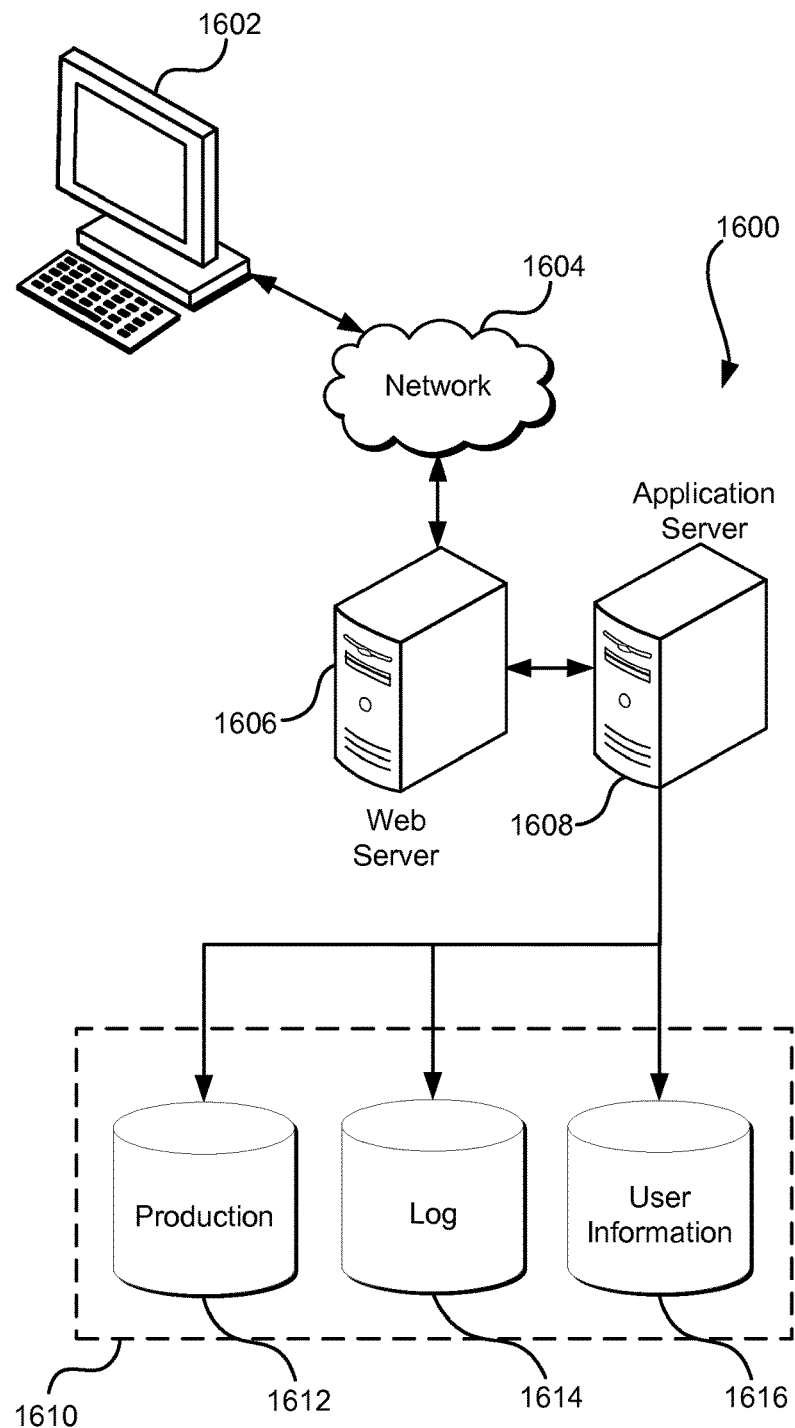
FIG. 16 illustrates an environment in which various embodiments can be implemented.

FIG. 16 illustrates aspects of an example environment 1600 for implementing aspects in accordance with various embodiments. As will be appreciated, although a web-based environment is used for purposes of explanation, different environments may be used, as appropriate, to implement various embodiments. The environment includes an electronic client device 1602, which can include any appropriate device operable to send and/or receive requests, messages, or information over an appropriate network 1604 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 1606 for receiving requests and serving content in response thereto, although for other networks an alternative device serving a similar purpose could be used as would be apparent to one of ordinary skill in the art.

The illustrative environment includes at least one application server 1608 and a data store 1610. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1602 and the application server 1608, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1610 can include several separate data tables, databases, data documents, dynamic data storage schemes and/or other data storage mechanisms and media for storing data relating to a particular aspect of the present disclosure. For example, the data store illustrated may include mechanisms for storing production data 1612 and user information 1616, which can be used to serve content for the production side. The data store also is shown to include a mechanism for storing log data 1614, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1610. The data store 1610 is operable, through logic associated therewith, to receive instructions from the application server 1608 and obtain, update or otherwise process data in response thereto. The application server 1608 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1602. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the system 1600 in FIG. 16 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other devices across the network may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving a request to begin a critical phase of a virtual machine migration for a first virtual machine instance;
   pausing, using a first hypervisor, execution of the first virtual machine instance, the first virtual machine instance having access to resources provided by the first hypervisor, the first virtual machine instance managed by the first hypervisor, the first hypervisor running on a first computer system of one or more computer systems;
   after pausing the execution, receiving network packets that are directed to the first virtual machine instance to an incoming packet queue provided by a privileged instance running on the first computer system, the privileged instance having access to resources of the first computer system, the privileged instance managed by the first hypervisor;
   validating a standby lease to a block storage device for a second virtual machine instance on a second computer system of the one or more computer systems, the standby lease acquired using a second hypervisor executing on the second computer system;
   completing a copy of memory from the first virtual machine instance to the second virtual machine instance;
   after copying the memory:
      forwarding the received network packets in the incoming packet queue to the second virtual machine instance;
      receiving new network packets directed to the first virtual machine instance; and
      routing the new network packets to the second virtual machine instance;
   converting an active lease to the block storage device for the first virtual machine instance to an inactive lease; and
   converting the standby lease to an active lease.

2. The computer-implemented method of claim 1, wherein receiving the network packets directed to the first virtual machine instance to the incoming packet queue is performed by the first hypervisor.

3. The computer-implemented method of claim 1, wherein receiving the network packets directed to the first virtual machine instance to the incoming packet queue is performed by a network translation service.

4. The computer-implemented method of claim 1, wherein memory and state of the first virtual machine instance is copied to the second virtual machine instance by the first hypervisor in parallel with pausing execution of the first virtual machine instance and in parallel with routing the network packets directed to the first virtual machine instance to the incoming packet queue.

5. A system, comprising at least one computing device configured to implement one or more services, wherein a first service of the one or more services is configured to:
in a pause stage, pause a first virtual machine instance;
in a route stage, route, while the first virtual machine instance is in the pause stage, network packets directed to the first virtual machine instance to an incoming packet queue;
send a message indicating completion of the route stage;
receive a message indicating completion of a standby lease stage associated with validating a standby lease for a block storage device;
in a packet forward stage, transfer the network packets from the incoming packet queue to a second virtual machine instance and route, by at least bypassing the incoming packet queue, new incoming network packets directed to the first virtual machine instance to the second virtual machine instance, the second virtual machine instance configured based at least in part on the first virtual machine instance, the second virtual machine instance located at a target location associated with a migration of the first virtual machine instance; and
send a message indicating completion of the packet forward stage.

6. The system of claim 5, wherein the first service is a hypervisor.

7. The system of claim 5, wherein a second service of the one or more services is configured to:
receive the message from the first service indicating the completion of the route stage;
validate the standby lease by associating the second virtual machine instance with the block storage device, the standby lease specifying a first policy of access to the block storage device by the second virtual machine instance; and
send the message indicating the completion of the standby lease stage.

8. The system of claim 7, wherein the second service is configured to:
receive the message indicating completion of the packet forward stage;
convert an active lease associating the first virtual machine instance with the block storage device to an inactive lease; and
convert the standby lease associated with the second virtual machine instance to an active lease, the active lease associated with the second virtual machine instance specifying a second policy of access to the block storage device by the second virtual machine instance.

9. The system of claim 7, wherein the second service is a hypervisor.

10. The system of claim 5, wherein the first service is configured to route the new incoming network packets addressed to the first virtual machine instance to the second virtual machine instance after memory is copied from the first virtual machine instance to the second virtual machine instance.

11. The system of claim 5, wherein the incoming packet queue is provided by a privileged instance associated with the first service.

12. The system of claim 5, wherein the first service is further configured to, before pausing the first virtual machine instance, at least:
perform a first iteration of a memory and state copy, the first iteration copying all the memory and state of the first virtual machine instance; and
perform one or more additional iterations of the memory and state copy, the one or more additional iterations copying the memory and state that have changed after previous iterations, until it is determined that a number of changes still remaining is below a threshold value.

13. One or more non-transitory computer-readable storage media having stored thereon executable instructions that, as a result of being executed by one or more processors of a computer system, cause the computer system to at least:
specify a set of flip stages, the set of flip stages including a pause stage associated with pausing a first virtual machine instance, a route stage associated with routing packets to an incoming packet queue, a standby lease stage associated with validating a standby lease for a block storage device, a packet forward stage associated with forwarding packets from the incoming packet queue to a second virtual machine instance and routing new packets, by at least bypassing the incoming packet queue, directed to the first virtual machine instance to the second virtual machine instance, and an active lease stage associated with activating the second virtual machine instance such that:
the pause stage is executed after a critical phase of a migration of the first virtual machine instance has started;
the route stage is executed after the pause stage completes;
the standby lease stage is executed after the route stage completes;
the packet forward stage is executed after the standby lease stage completes; and
the active lease stage is executed after the packet forward stage completes; and
instantiate a first hypervisor configured to cause the computer system to at least:
validate the standby lease by associating the second virtual machine instance with the block storage device;
convert an active lease by associating the first virtual machine instance with the block storage device to an inactive lease; and
convert the standby lease to an active lease.

14. The one or more non-transitory computer-readable storage media of claim 13, wherein the executable instructions, as a result of being executed by the one or more processors, further cause the computer system to at least:
instantiate a second hypervisor configured to at least:
pause the first virtual machine instance;
route network packets directed to the first virtual machine instance to the incoming packet queue; and
transfer the network packets from the incoming packet queue to the second virtual machine instance.

15. The one or more non-transitory computer-readable storage media of claim 14, wherein the first hypervisor and the second hypervisor are further configured to make one or more remote procedure calls, each remote procedure call of the one or more remote procedure calls specifying a corresponding flip stage of the set of flip stages, each remote procedure call configured to cause a service of the computer system to perform one or more operations.

16. The one or more non-transitory computer-readable storage media of claim 15, wherein the first hypervisor and the second hypervisor are further configured to perform the one or more operations as a result of receiving the one or more remote procedure calls.

17. The one or more non-transitory computer-readable storage media of claim 14, wherein the executable instructions, as a result of being executed by the one or more processors, further cause the computer system to specify a set of unflip stages, the set of unflip stages including a first unflip stage, a second unflip stage, a third unflip stage, a fourth unflip stage, and a fifth unflip stage such that:
- the first unflip stage is configured to undo the pause stage;
- the second unflip stage is configured to undo the route stage;
- the third unflip stage is configured to undo the standby lease stage;
- the fourth unflip stage is configured to undo the packet forward stage; and
- the fifth unflip stage configured to undo the active lease stage.

18. The one or more non-transitory computer-readable storage media of claim 17, wherein the first hypervisor and the second hypervisor are further configured to make one or more remote procedure calls, each remote procedure call of the one or more remote procedure calls specifying a corresponding unflip stage of the set of unflip stages, each remote procedure call configured to cause a service of the computer system to perform one or more operations.

19. The one or more non-transitory computer-readable storage media of claim 17, wherein, in response to detecting a failure of a flip stage of the set of flip stages, a subset of the set of unflip stages is performed by the computer system, the subset selected from the set of unflip stages based at least in part on the failure.

20. The one or more non-transitory computer-readable storage media of claim 17, wherein, in response to detecting a cancellation of the migration of the first virtual machine instance, a subset of the set of unflip stages is performed by the computer system, the subset selected from the set of unflip stages based at least in part on the critical phase of the migration.

* * * * *